US010051204B2

(12) United States Patent
Gopinath et al.

(10) Patent No.: US 10,051,204 B2
(45) Date of Patent: Aug. 14, 2018

(54) SEAMLESS SETUP AND CONTROL FOR HOME ENTERTAINMENT DEVICES AND CONTENT

(71) Applicant: Caavo Inc, Santa Clara, CA (US)

(72) Inventors: Vinod Gopinath, Bangalore (IN); Ashish Aggarwal, Stevenson Ranch, CA (US)

(73) Assignee: Caavo Inc, Milpitas, CA (US)

( * ) Notice: Subject to any disclaimer, the term of this patent is extended or adjusted under 35 U.S.C. 154(b) by 0 days.

(21) Appl. No.: 14/945,175

(22) Filed: Nov. 18, 2015

(65) Prior Publication Data

US 2016/0142648 A1 May 19, 2016

Related U.S. Application Data

(60) Provisional application No. 62/081,430, filed on Nov. 18, 2014.

(51) Int. Cl.
*H04N 5/268* (2006.01)
*H04N 5/44* (2011.01)

(52) U.S. Cl.
CPC ............ *H04N 5/268* (2013.01); *H04N 5/4403* (2013.01)

(58) Field of Classification Search
CPC .............................................. H04N 21/43635
USPC .................................................. 348/705, 706
See application file for complete search history.

(56) References Cited

U.S. PATENT DOCUMENTS

| 6,198,741 | B1 * | 3/2001 | Yoshizawa | .......... | H04L 12/4641 |
| | | | | | 370/379 |
| 6,898,620 | B1 * | 5/2005 | Ludwig | ..................... | H04N 7/15 |
| | | | | | 348/14.09 |
| 8,040,888 | B1 * | 10/2011 | MacAdam | .......... | H04L 12/6418 |
| | | | | | 370/389 |
| 8,813,165 | B2 * | 8/2014 | Klughart | .................. | H04N 5/76 |
| | | | | | 386/200 |

(Continued)

FOREIGN PATENT DOCUMENTS

EP    2608563 A1    6/2013

OTHER PUBLICATIONS

International Search Report and Written Opinion received for PCT Patent Application No. PCT/US2015/061398, dated Feb. 12, 2016, 15 pages.

(Continued)

*Primary Examiner* — Paulos M Natnael
(74) *Attorney, Agent, or Firm* — Fiala & Weaver P.L.L.C.

(57) ABSTRACT

Embodiments described herein enable a switching device to automatically select AV port(s) coupled to electronic device(s) that a user would like to use to watch and/or listen to content. The AV port(s) may be automatically selected based on receiving a command, determining that a particular remote control device is being used, and/or determining that a particular piece of content has been selected. Upon detection of such events, a source device for providing content is identified from among a plurality of source devices. Thereafter, an AV port from among a plurality of AV ports to which the identified source device is connected is identified. The identified AV port is then selected so that the identified source device becomes connected to an AV port to which a sink device is connected. In this way, the switching device can provide content from the identified source device to the sink device for presentation thereby.

14 Claims, 14 Drawing Sheets

(56) References Cited

U.S. PATENT DOCUMENTS

| | | | | |
|---|---|---|---|---|
| 8,839,334 B2* | 9/2014 | Lee | ............. | H04N 21/65 725/127 |
| 9,256,071 B1* | 2/2016 | Spitzer | ............. | G02B 27/017 |
| 2003/0043740 A1* | 3/2003 | March | ............. | H04L 29/06027 370/229 |
| 2003/0167171 A1* | 9/2003 | Calderone | ............. | 704/270 |
| 2004/0255329 A1* | 12/2004 | Compton | ............. | H04N 21/234327 725/109 |
| 2005/0086694 A1* | 4/2005 | Hicks | ............. | H04H 20/63 725/79 |
| 2006/0146184 A1* | 7/2006 | Gillard | ............. | H04L 47/10 348/398.1 |
| 2007/0153132 A1* | 7/2007 | Jong | ............. | H04N 5/775 348/705 |
| 2007/0292135 A1* | 12/2007 | Guo | ............. | H04B 10/1143 398/106 |
| 2008/0120673 A1* | 5/2008 | Dong | ............. | H04N 7/173 725/118 |
| 2009/0325704 A1* | 12/2009 | Tom | ............. | A63F 13/10 463/39 |
| 2011/0300929 A1* | 12/2011 | Tardif | ............. | A63F 13/06 463/30 |
| 2011/0317076 A1* | 12/2011 | Chen | ............. | H04N 21/436 348/705 |
| 2013/0167188 A1* | 6/2013 | Lee | ............. | H04N 21/65 725/127 |
| 2013/0282897 A1* | 10/2013 | Siegel | ............. | H04L 45/02 709/224 |
| 2014/0132839 A1* | 5/2014 | Chang | ............. | H04N 5/4403 348/570 |
| 2014/0280547 A1* | 9/2014 | DeCusatis | ............. | H04L 67/34 709/204 |
| 2015/0295808 A1* | 10/2015 | O'Malley | ............. | H04L 47/22 709/224 |
| 2016/0065886 A1* | 3/2016 | Bilbrey | ............. | H04N 5/76 386/230 |
| 2016/0173807 A1* | 6/2016 | Thompson | ............. | H04N 5/268 348/569 |

OTHER PUBLICATIONS

Hitachi Ltd., "High-Definition Multimedia Interface Specification Version 1.3a", retrieved from the Internet <http://www.hdmi.org/download/HDMISpecification13a.pdf>, Nov. 10, 2006, 276 pages.
International Preliminary Report on Patentability received for PCT Patent Application No. PCT/US2015/061398, dated Jun. 1, 2017, 10 Pages.

* cited by examiner

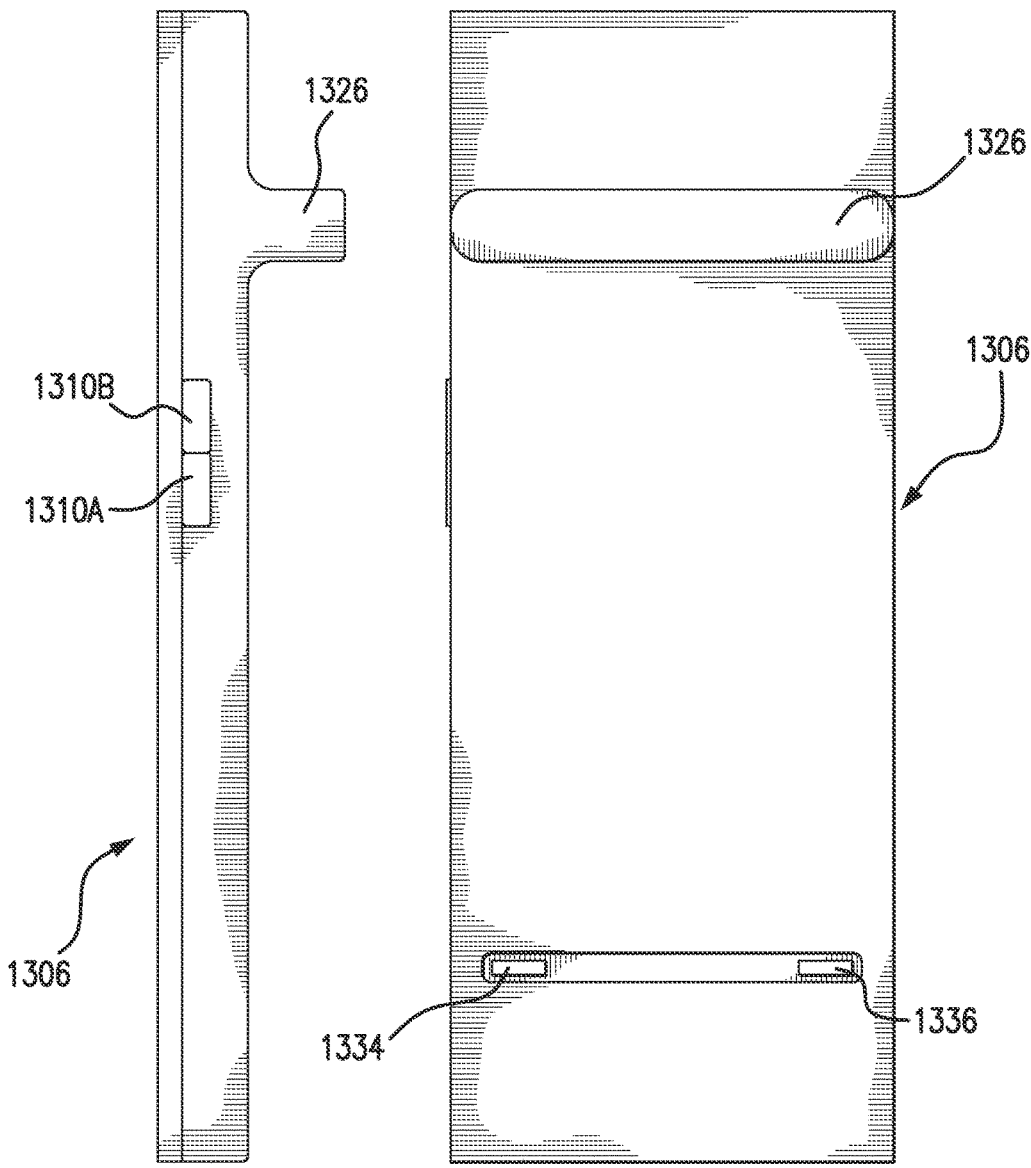

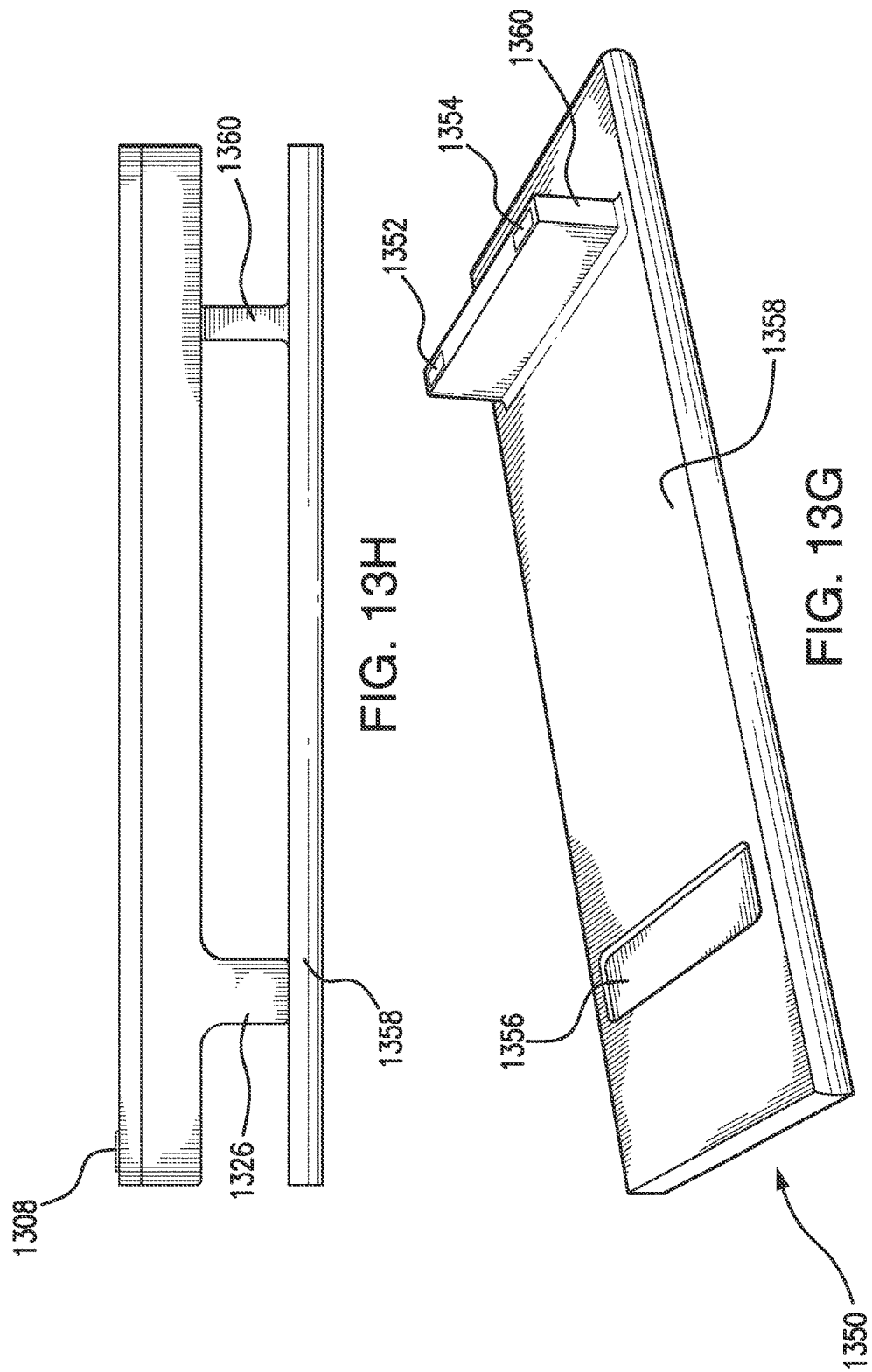

SEAMLESS SETUP AND CONTROL FOR HOME ENTERTAINMENT DEVICES AND CONTENT

CROSS-REFERENCE TO RELATED APPLICATIONS

This application claims priority to U.S. Provisional Patent Application No. 62/081,430, filed Nov. 18, 2014, the entirety of which is incorporated by reference herein.

This application is also related to the following U.S. Patent Application, which is incorporated by reference herein:

U.S. patent application Ser. No. 14/945,079, filed on even date herewith and entitled "Auto Detection and Adaptive Configuration of HDMI Ports," which claims priority to U.S. Provisional Application No. 62/081,401, filed Nov. 18, 2014, the entirety of which is incorporated by reference;

U.S. patent application Ser. No. 14/945,201, filed on even date herewith and entitled "Automatic Detection of a Power Status of an Electronic Device and Control Schemes Based Thereon," which claims priority to U.S. Provisional Application No. 62/081,397, filed Nov. 18, 2014, the entirety of which is incorporated by reference;

U.S. patent application Ser. No. 14/945,125, filed on even date herewith and entitled "Automatic Identification and Mapping of Consumer Electronic Devices to Ports on an HDMI Switch," which claims priority to U.S. Provisional Application No. 62/081,414, filed Nov. 18, 2014, the entirety of which is incorporated by reference; and U.S. patent application Ser. No. 14/945,233, filed on even date herewith and entitled "Audio/Video Synchronization Using a Device with Camera and Microphone," which claims priority to U.S. Provisional Application No. 62/081,423, filed Nov. 18, 2014, the entirety of which is incorporated by reference.

BACKGROUND

Technical Field

The present invention relates to methods, systems, and apparatuses for the setup and control of home entertainment devices and content.

Background Art

A typical home entertainment system may consist of a variety of different multimedia devices, such as a television (TV), a cable/satellite set-top box, video game consoles such as Xbox™ or Playstation™, media streaming devices, such as Roku™, AppleTV™, Chromecast™, and a host of other devices, such as Blu-ray™ players and compact disc (CD) players. Very often, these devices are connected through an audio-video receiver (AVR). A user's interaction with these devices can be classified into four distinct set of operations: (1) initial setup; (2) switching sources and control of devices; (3) accessing and controlling content playback; and (4) reconfiguration of the system when devices are added or removed.

The initial setup of multimedia devices not only includes wiring and connections, which can be quite intimidating, but also involves setting up a myriad of options in each of the devices. The crow's nest of wires makes it extremely difficult to trace back the connections in case one needs to make any changes. Furthermore, High-Definition Multimedia Interface (HDMI) interfaces require a user to identify which HDMI ports are input ports and which HDMI ports are output ports, thereby making setup even more complicated. Moreover, many TVs today are installed on the wall, which makes finding and reaching HDMI ports on the back of such TVs extremely difficult, let alone aligning the right cable so that it can be inserted into the port properly.

Once devices are connected, it becomes quite difficult to remember which device is connected to which port. Thus, switching between devices accurately becomes quite a struggle. For example, if a user wants to switch to a video game console, the user has to remember the port to which the game console is connected. As described above, devices, such as TVs and AVRs, require HDMI ports to be manually configured using menu options to identify which device is connected to which port. However, this option is quite cumbersome and seldom performed by the user.

In addition, the TV and AVR remote controls are difficult to use, but are essential to control the devices and other functions. For example, the TV or AVR remote control is required for selecting a particular device and other operations, such as volume control. However, due to the limited functionality of the TV or AVR remote control, the user needs to find and operate the device's remote control to start controlling the device (e.g., play, pause, stop, etc.). Thereafter, if the user decides to watch a program on the cable set-top box, he has to once again find the TV remote, remember which port the set-top box was connected to, switch to that port, and then operate the set-top box remote control and use it to control the device.

Once the devices are all set up and the user has learned to use the myriad of remote controls, day-to-day use involves the manner in which a user accesses content for viewing. For example, the content may be available for viewing via a software application installed on a device (e.g., a Blu-ray™ player, a TV, a media streaming device), or it may be being broadcast on a channel viewable via a cable/satellite set-top box. The need to search for content by applications, devices, broadcast times, etc. can be cumbersome. Once the content is found, switching to a particular device, launching the application and/or selecting/playing the content, is clumsy and inconvenient.

Moreover, if a user adds or removes a device from the setup, the whole setup process has to be repeated, and new inputs and controls have to be learned.

BRIEF SUMMARY

Methods, systems, and apparatuses are described for the setup and control of home entertainment devices and content, substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

FIG. 13E is a bottom view of the control device shown in FIG. 13B.

FIG. 13F is a left side view of the control device shown in FIG. 13B.

FIG. 13G is a perspective view of a charging device configured to charge the control device shown in FIGS. 13A-13F in accordance with an embodiment.

FIG. 13H is a left side view of the control device shown in FIGS. 13A-13F when coupled to the charging device shown in FIG. 13G in accordance with an embodiment.

Embodiments will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

Introduction

Figure 1:
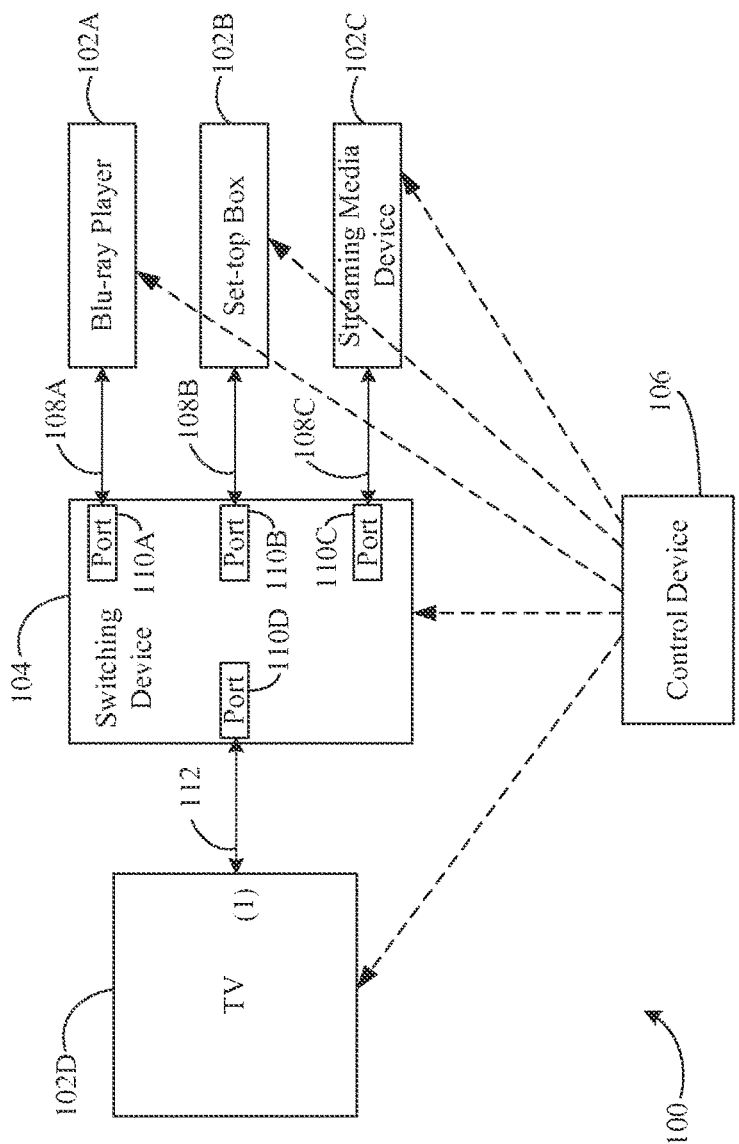
FIG. 1 is a block diagram of a system that is configured to automatically setup and control a plurality of electronic devices and the content provided thereby and/or played back thereon in accordance with an embodiment.

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," "front," "rear," etc.) used herein are for purposes of illustration only, and that practical implementations of the structures described herein can be spatially arranged in any orientation or manner.

Numerous exemplary embodiments are described as follows. It is noted that the section/subsection headings used herein are not intended to be limiting. Embodiments described in this document may be eligible for inclusion within multiple different sections or subsections. Furthermore, disclosed embodiments may be combined with each other in any manner.

A method performed by a switching device that comprises a plurality of audio/video (AV) ports and a switch circuit that is operable to selectively connect any one of a plurality of source devices, each of which is connected to a corresponding one of the plurality of AV ports, to a sink device that is connected to another one of the plurality of AV ports is described herein. In accordance with the method, a command is received. Based on the command, a source device from among the plurality of source devices to be used for providing content is identified. A first AV port from among the plurality of AV ports to which the identified source device is connected is identified. The first AV port is automatically connected to the AV port to which the sink device is connected so that content can be provided from the identified source device to the sink device.

In accordance with one or more embodiments, the method further comprises based on the command, identifying the sink device from among a plurality of sink devices connected to corresponding ones of the plurality of AV ports, and identifying a second AV port from among the plurality of AV ports to which the sink device is connected, wherein the automatically connecting comprises automatically connecting the first AV port to the second AV port.

In accordance with one or more embodiments, the command is a voice command.

In accordance with one or more embodiments, the command originates from a remote control device.

In accordance with one or more embodiments, the command is received via at least one of the following transmission schemes: an infrared-based transmission scheme, a radio frequency-based transmission scheme, and an internet protocol-based transmission scheme.

In accordance with one or more embodiments, the plurality of AV ports are HDMI ports.

In accordance with one or more embodiments, the command includes an identifier of the source device to be used for providing content.

In accordance with one or more embodiments, the method further comprises transmitting a control signal to the source device that causes the source device to be powered on.

A switching device is also described herein. The switching device includes a plurality of AV ports and a switch circuit that is operable to selectively connect any one of a plurality of source devices, each of which is connected to a corresponding one of the plurality of AV ports, to a sink device that is connected to another one of the plurality of AV ports. The switching device is configured to determine that a remote control device is being utilized, identify a source device that is associated with the remote control device from among the plurality of source devices, identify a first AV port from among the plurality of AV ports to which the identified source device is connected, and automatically connect the first AV port to the AV port to which the sink device is connected so that content can be provided from the identified source device to the sink device.

In accordance with one or more embodiments, the switching device is configured to determine that a remote control device being utilized by receiving a control signal from the remote control device intended for a particular electronic device, and determining that the remote control device is being utilized in response to receiving the control signal.

In accordance with one or more embodiments, the switching device is configured to identify a source device from among the plurality of source devices that is associated with the remote control device by detecting an indicator included in the control signal that uniquely identifies the source device.

In accordance with one or more embodiments, the switching device is further configured to determine that a second remote control device is being utilized, identify a second source device that is associated with the second remote control device from among the plurality of source devices, identify a second AV port from among the plurality of AV ports to which the identified second source device is connected, and automatically connect the second AV port to the AV port to which the sink device is connected to that content can be provided by the identified second source device to the sink device.

In accordance with one or more embodiments, the control signal is received via at least one of the following transmission schemes: an infrared-based transmission scheme, a radio frequency-based transmission scheme, and an internet protocol-based transmission scheme.

In accordance with one or more embodiments, the plurality of AV ports are HDMI ports.

In accordance with one or more embodiments, the switching circuit being further configured to transmit a control signal to the identified source device that causes the identified source device to be powered on.

A system is further described herein. The system includes one or more processors and a memory containing computer-readable instructions, which, when executed by the one or more processors, is configured to perform operations in a switching device comprising a plurality of AV ports and a switch circuit that is operable to connect any one of a plurality of source devices, each of which is connected to a corresponding one of the plurality of AV ports, to a sink device that is connected to another one of the plurality of AV ports. In accordance with the operations, a determination is made that a user has made a selection to engage in a piece of content. A source device from the plurality of source devices that is configured to provide the piece of content is identified based on the selection. A first AV port from among the plurality of AV ports to which the identified source device is connected is identified. The first AV port is automatically connected to the AV port to which the sink device is connected so that content can be provided from the identified source device to the sink device.

In accordance with one or more embodiments, identifying a source device from the plurality of source devices comprises determining one or more source devices from among the plurality of source devices that are configured to provide the content, and selecting one of the one or more source devices to be the identified source device based on a priority scheme.

In accordance with one or more embodiments, the operations further comprise based on the selection, identifying the sink device from among a plurality of sink devices connected to corresponding ones of the plurality of AV ports, and identifying a second AV port from among the plurality of AV ports to which the sink device is connected, wherein the automatically connecting comprises automatically connecting the first AV port to the second AV port.

In accordance with one or more embodiments, the operations further comprise transmitting a control signal to the identified source device that causes the identified source device to be powered on.

In accordance with one or more embodiments, the plurality of AV ports are HDMI ports.

Example Embodiments

Embodiments described herein enable a switching device to automatically select one or more AV ports that are coupled to one or more electronic devices that a user would like to use to watch and/or listen to content. The AV port(s) may be automatically selected based on receiving a command (e.g., a voice command or a command from a remote control device), determining that a particular remote control device is being used, and/or determining that a particular piece of content has been selected. Upon detection of any of these events, a source device for providing content is identified from among a plurality of source devices. Thereafter, an AV port from among a plurality of AV ports to which the identified source device is connected is identified. The identified AV port is then selected so that the identified source device becomes connected to an AV port to which a sink device is connected. In this way, the switching device can provide content from the identified source device to the sink device for playback thereby.

FIG. 1 is a block diagram of a system 100 that is configured to automatically setup and control a plurality of electronic devices 102A-102D and content provided thereby and/or played back thereon. As shown in FIG. 1, system 100 includes electronic devices 102A-102D, a switching device 104, and a control device 106.

Electronic devices 102A-102C are configured to provide audio and/or video signals (e.g., audio and/or video signals 108A, 108B, 108C, respectively) for playback and are referred to as "source" devices. Electronic device 102D is configured to receive audio and/or video signals (e.g., audio and/or video signals 112) and is referred to as a "sink" device. As shown in FIG. 1, electronic device 102A is coupled to a first AV port 110A of switching device 104, electronic device 102B is coupled to a second AV port 110B of switching device 104, electronic device 102C is coupled to a third AV port 110C of switching device 104, and electronic device 102D is coupled to a fourth AV port 110D of switching device 104. In accordance with an embodiment, AV ports 110A-110D are High Definition Media Interface (HDMI) ports. However, embodiments described herein are not so limited. As further shown in FIG. 1, electronic device 102A is a Blu-ray player, electronic device 102B is a set-top box, electronic device 102C is a streaming media device, and electronic device 102D is a TV. Examples of a streaming media device include, but are not limited to, a Roku™ device, an AppleTV™ device, a Chromecast™, and/or the like. The depiction of these particular electronics devices is merely for illustrative purposes. It is noted that while FIG. 1 shows that switching device 104 includes four AV ports 110A-110D, switching device 104 may include any number of AV ports, and therefore, may be coupled to any number of electronic devices.

Switching device 104 is configured to select (e.g., switch between) different audio and/or video source devices that are coupled to AV ports 110A-110C (e.g., electronic device 102A, electronic device 102B or electronic device 102C) and provide an output signal (e.g., audio and/or video signals 112) comprising audio and/or video signals (e.g., audio and/or video signals 108A, audio and/or video signals 108B or audio and/or video signals 108C) provided by the selected audio/video source. Audio and/or video signals 112 are provided to electronic device 102D that is coupled to AV port 110D. Audio and/or video signals 112 may also be provided to any other device capable of playing back audio and/or video signals (e.g., speakers) that may be coupled to AV port 102D and/or other port(s) (not shown) of switching device 104.

Each of AV ports 110A-110D may be configurable to be coupled to either a source device (e.g., electronic device 102A, electronic device 102B, or electronic device 102C) or a sink device (e.g., electronic device 102D). For example, switching device 104 may be configured to automatically determine whether an electronic device coupled to a particular AV port is a source device or a sink device. Based on that determination, switching device 104 may configure that AV port to be a source AV port or a sink AV port. Additional details regarding the auto-configuration of AV ports 110A-110D is described below in Subsection A.

Switching device 104 may also be configured to automatically identify (e.g., determine) the electronic device coupled to each of AV ports 110A-110D. For example, for each electronic device coupled to a particular AV port, switching device 104 may be configured to determine one or more identifiers of the electronic device, such as, but not limited to, a type of the electronic device (e.g., a DVD player, a Blu-ray player, a video game console, a streaming media device, a TV, an HDTV, a projector, etc.), a brand name of the electronic device, a manufacturer of the electronic device, a model number of the electronic device, etc. The identifier(s) may be determined according to various techniques, such as, but not limited to: techniques based on HDMI consumer electronics control (CEC), identification via video data, identification via audio data, identification via IP network, remote control operation by a user, voice input from a user, and explicit device selection by a user. Upon determining the identifier(s), switching device 104 may be configured to map the identified electronic device to the AV port to which that electronic device is connected. This process may be referred to as "device-to-port mapping". Additional details regarding device-to-port mapping is described below in Subsection B.

Switching device 104 may be further configured to automatically select or switch between AV ports 110A-110C based on determining which electronic device(s) a user would like to use for providing and/or presenting content. For example, in accordance with an embodiment, switching device 104 is configured to automatically select one or more of AV port(s) 110A-110C based on receiving a command (e.g., a voice command or a command from a remote control device) that indicates the electronic device(s) that the user would like to use. After determining the electronic device(s) that the user would like to use, switching device 104 may determine which AV port(s) are coupled to the determined electronic device(s) using the device-to-port mapping described above. After determining which AV port(s) are coupled to the determined electronic device(s), switching device 104 may automatically select (or switch to) those AV port(s) for providing and/or playing back content. Additional details regarding automatically selecting an AV port based on receiving a command are described below in Subsection C.1.

In accordance with another embodiment, switching device 104 is configured to automatically select or switch to an AV port based on determining that a particular remote control device is being used. For example, switching device 104 may determine that a user is using a remote control device associated with electronic device 102A. In response, switching device 104 may determine the AV port to which electronic device 102A is connected (e.g., AV port 110A) using the device-to-port mapping described above. After determining that electronic device 110A is connected to AV port 110A, switching device 104 may automatically select (or switch to) AV port 110A, thereby enabling electronic device 110A to provide audio and/or video signals 108A to electronic device 102D for playback. Additional details regarding automatically selecting an AV port based on determining that a particular remote control device is being used are described below in Subsection C.2.

In accordance with yet another embodiment, switching device 104 may be configured to automatically select or switch to an AV port based on content selection. For example, when a user selects a particular piece of content to engage in via a GUI (e.g., provided via a display device (e.g., electronic device 102D)) or control device 106 (as described below), switching device 104 may determine which electronic device coupled to switching device 104 is best suited to provide the particular piece of content. Thereafter, switching device 104 may determine the AV port to which the determined electronic device is connected using the device-to-port mapping described above, and automatically select (or switch to) that AV port. Additional details regarding automatically selecting an AV port based on content selection are described below in Subsection C.3.

Control device 106 may be operable to control any or all of electronic devices 102A-102D and/or switching device 104. Control device 106 may include a display screen and/or one or more physical interface elements (e.g., buttons, sliders, jog shuttles, etc.). In accordance with an embodiment, the display screen (or a portion thereof) may be a capacitive touch display screen. The display screen may be configured to display one or more virtual interface elements (e.g., icons, buttons, search boxes, etc.). The display screen may be configured to enable a user to interact, view, search, and/or select content for viewing via any of electronic device 102A-102D and switching device 104. Additional details regarding one exemplary implementation of control device 106 are provided below in reference to FIGS. 13A-13G.

In accordance with an embodiment, control device 106 may be operable to control any or all of electronic devices 102A-102D by transmitting control signals thereto. In accordance with an embodiment, the control signals are transmitted via a wired connection (e.g., via a Universal Serial Bus (USB) cable, a coaxial cable, etc.). In accordance with another embodiment, the control signals are transmitted via a wireless connection (e.g., via infrared (IR) communication, radio frequency (RF) communication (e.g., Bluetooth™, as described in the various standards developed and licensed by the Bluetooth™ Special Interest Group, technologies such as ZigBee® that are based on the IEEE 802.15.4 standard for wireless personal area networks, near field communication (NFC), other RF-based or internet protocol (IP)-based communication technologies such as any of the well-known IEEE 802.11 protocols, etc.) and/or the like.

In accordance with an embodiment, control device 106 is a mobile device, such as a telephone (e.g., a smart phone and/or mobile phone), a personal data assistance (PDA), a tablet, a laptop, etc. In accordance with another embodiment, control device 106 is a dedicated remote control device including smart features such as those typically associated with a smart phone (e.g., the capability to access the Internet and/or execute variety of different software applications), but without the capability of communicating via a cellular network.

A. Automatic Configuration of AV Ports

Figure 2:
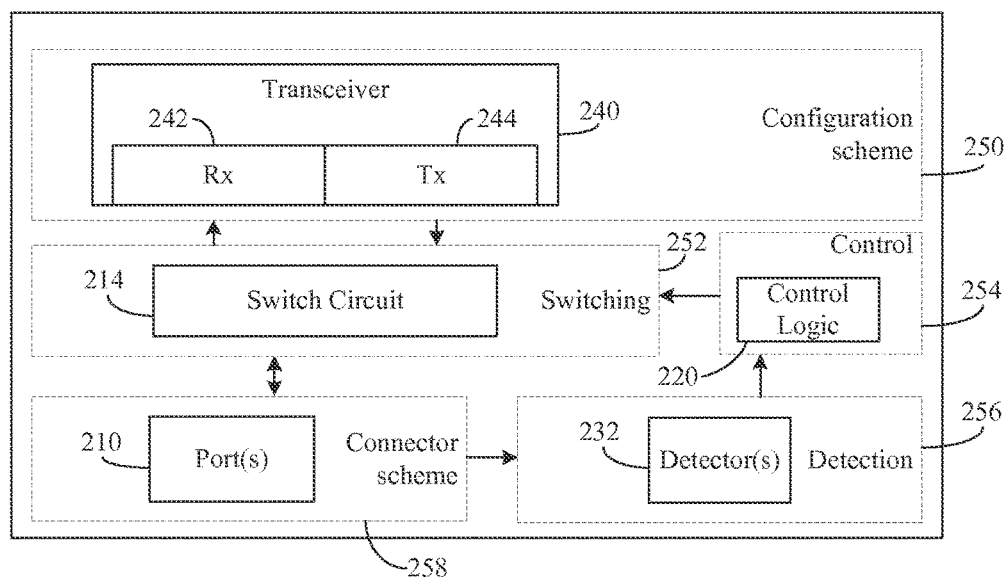
FIG. 2 is a block diagram of a switching device that is configured to automatically configure audio/video (AV) port(s) to be coupled either to a source device or a sink device in accordance with an embodiment.

FIG. 2 is a block diagram of a switching device 204 that is configured to automatically configure audio/video (AV) port(s) to be coupled either to a source device or a sink device in accordance with an embodiment. Switching device 204 may be an example of switching device 104, as described above in reference to FIG. 1. Switching device 204 may include a number of sub-schemes according to embodiments: a configuration scheme 250, a switching scheme 252, a control scheme 254, a detection scheme 256, and a connector scheme 258. According to various embodiments, the sub-schemes shown may be combined with each other, separated into multiple components, etc.

Connector scheme 258 includes one or more AV ports 210 (also referred to as AV connectors). In accordance with an embodiment, AV port(s) 210 are configured to accept HDMI connections from HDMI enabled devices, such as HDMI sink devices and HDMI source devices. According to embodiments, any AV port of AV port(s) 210 may accept a sink device or a source device. While not shown for illustrative clarity, a typical signal conditioning scheme may also be retained to meet the strict compliance requirements for the standard used to implement AV port(s) 210 (e.g., an HDMI standard in an embodiment where AV port(s) 210 are HDMI AV port(s)).

Configuration scheme 250 includes a transceiver 240 that includes an input component RX 242 and an output component TX 244. Transceiver 240 is configured to receive audio and/or video signals at input component RX 242 and to transmit audio and/or video signals from output component TX 244. In other words, transceiver 240 provides received input audio and/or video signals from source devices as output audio and/or video signals to sink devices, in accordance with the embodiments herein. It is also contemplated herein that one or more of input component RX 242 and/or an output component TX 244 may be included in transceiver 240 in various embodiments.

Detection scheme 256 may include one or more detectors 232 that are configured to detect indicia of operational modes to determine a type of an electronic device (e.g., an HDMI-enabled device) connected to AV port(s) 210 (i.e., whether the electronic device is a source or a sink). In embodiments, detectors 232 may be configured to make such a detection/determination based on signals received from AV port(s) 210.

Control scheme 254 may include control logic 220 that is configured to receive the detected indicia or signals based thereon from detectors 232 and use the received information to control one or more aspects of switching scheme 252, such as one or more switches included therein.

Switching scheme 252 includes switch circuit 214. Switch circuit 214 may be configured to provide switched connections between AV port(s) 210 and transceiver 240. That is, switch circuit 214 may provide a connection between any AV port of AV port(s) 210 and any receiver (e.g., input component RX 242) or transmitter (e.g., output component TX 244) of transceiver 240. Switch circuit 214 may comprise one or more switch circuit portions and may be combined or used in conjunction with other sub-schemes of switching device 204.

Accordingly, there is no need to pre-define the function of any port of AV port(s) 210. That is, AV port(s) 210 can be configured either as inputs or outputs. Additionally, detector(s) 232 are configured to detect the type of electronic device (i.e., a source device or a sink device) connected to an AV port of AV port(s) 210 and provide this information as input to control scheme 254, which may then issue appropriate commands to switch circuit 214 to either connect to input component RX 242 or output component TX 244 of transceiver 240. Thus, the same AV port can act as an input or an output depending on which type of electronic device is connected and considerably enhance the convenience of an interface process of switching device 204 (e.g., a process in which a user connects electronic device(s) to AV port(s) 210 of switching device 204).

Accordingly, the techniques and embodiments described herein provide for improvements in auto-detection and adaptive configuration of AV port(s), as described above. Additional details regarding the auto-configuration of AV port(s) may be found in U.S. patent application Ser. No. 14,945,079, filed on even date herewith and entitled "Auto Detection and Adaptive Configuration of HDMI Ports," the entirety of which is incorporated by reference.

B. Automatic Port Mapping to Connected Devices

Figure 3:
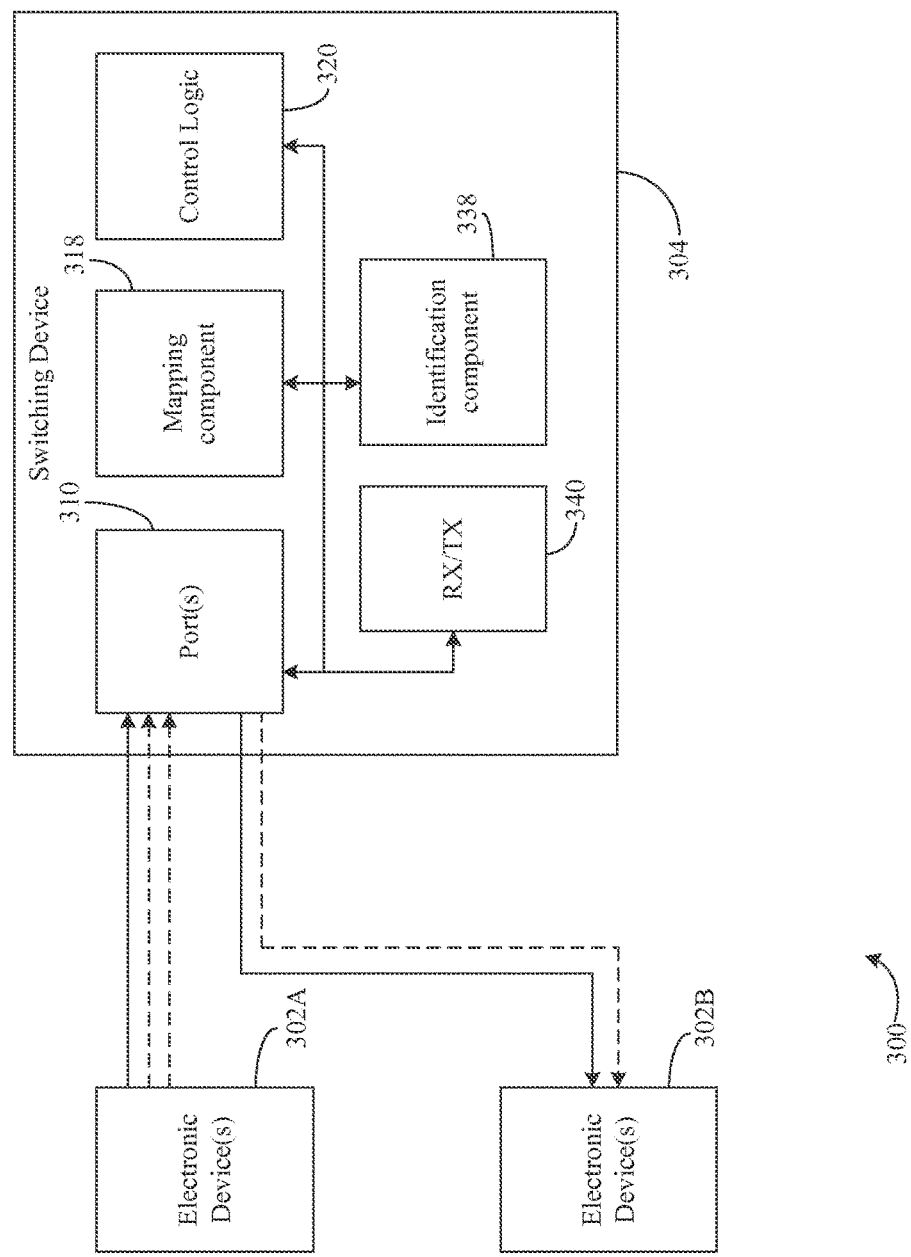
FIG. 3 is a block diagram of a switching device that is configured to automatically identify each electronic device coupled an AV port and map each identified electronic device to the AV port in accordance with an embodiment.

FIG. 3 is a block diagram of a system 300 that is configured to automatically identify electronic device(s) coupled to AV port(s) of a switching device and map the identified electronic device(s) to the AV port(s) to which they are connected in accordance with an embodiment. As shown in FIG. 3, system 300 includes one or more electronic devices 302A, one or more electronic devices 302B and switching device 304. Electronic device(s) 302A are source devices configured to provide audio and/or video signals. Electronic device(s) 302B are sink devices configured to receive audio and/or video signals. Electronic device(s) 302A may be examples of electronic devices 102A-102C, and electronic device(s) 302B may be examples of electronic device 102D, as described above in reference to FIG. 1.

Switching device 304 may be an example of switching device 104 or switching device 204, as described above in reference to FIGS. 1 and 2, respectively. As shown in FIG. 3, switching device 304 includes AV port(s) 310, transceiver 340, mapping component 318, control logic 320 and identification component 338. Each of electronic devices 302A and 302B are coupled to an AV port of AV port(s) 310. Each of AV port(s) 310 may be automatically configured to be a source AV port or a sink AV port in a similar manner as described above in Subsection A.

Transceiver 340 may be an example of transceiver 240 as described above in reference to FIG. 2. Accordingly, transceiver 304 may be configured to receive audio and/or video signals and to transmit audio and/or video signals. In other words, transceiver 340 provides received input audio and/or video signals from source devices as output audio and/or video signals to sink devices, in accordance with the embodiments herein.

Identification component 338 may be configured to identify the electronic device (e.g., electronic device(s) 302A or 302B) coupled to each AV port of AV port(s) 310. For example, for each electronic device(s) 302A or 302B, identification component 338 may be configured to determine identifier(s) of the electronic device, such as, but not limited to a type of the electronic device (e.g., a DVD player, a Blu-ray player, a video game console, a streaming media device, a TV, an HDTV, a projector, etc.), a brand name of the electronic device, a manufacturer of the electronic device, a model number of the electronic device, etc. The identifier(s) may be determined according to various techniques, such as, but not limited to: techniques based on HDMI consumer electronics control (CEC), identification via video data, identification via audio data, identification via IP network, remote control operation by a user, voice input from a user, and explicit device selection by a user. Identification component 338 provides the identifier(s) to mapping component 318.

Mapping component 318 is configured to determine a device-to-port mapping based on the identifier(s) received from identification component 338. For example, mapping component 318 may generate a data structure (e.g., a table) that associates the identifier(s) for any given identified electronic device to the AV port to which that electronic device is coupled. In this way, the device-to-port mapping may indicate that a first electronic device (e.g., a Blu-ray player) is coupled to a first AV port (e.g., AV Port 1), that a second electronic device (e.g., a set-top box) is coupled to a second AV port (e.g., AV Port 2), and that a third electronic device (e.g., a TV) is coupled to a third AV port (e.g., AV Port 3).

Additional details regarding the identification of electronic device(s) and the mapping of electronic device(s) to AV port(s) may be found in U.S. patent application Ser. No. 14/945,125, filed on even date herewith and entitled "Automatic Identification and Mapping of Consumer Electronic Devices to Ports on an HDMI Switch," the entirety of which is incorporated by reference.

Control logic 320 may be an example of control logic 220 as described above in reference to FIG. 2. As described below in Subsection C, control logic 320 may be cause certain AV port(s) 310 to be automatically selected based on an identification of which of electronic device(s) 302A or 302B a user would like to use for providing and/or presenting content and using the device-to-port mapping of mapping component 318 to identify the AV port(s) to which the identified electronic device(s) are coupled.

C. Automatic Port Selection

Figure 4:
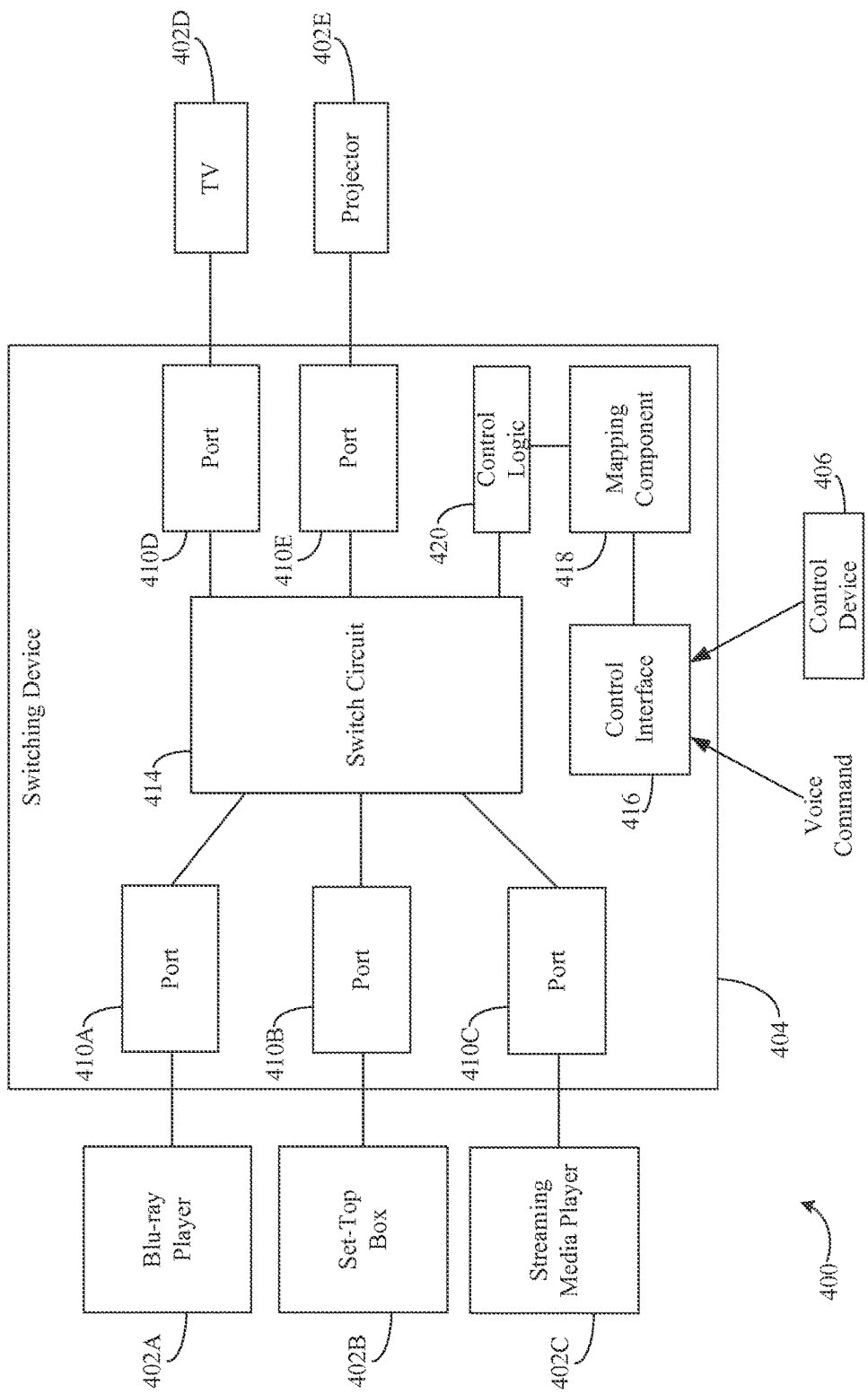
FIG. 4 is a block diagram of a system that is configured to automatically select an AV port of a switching device based on a command that indicates electronic device(s) that a user would like to use in accordance with an embodiment.

1. Automatic Port Selection Based on Receiving a Command Indicating the Electronic Device(s) that a User Would Like to Use FIG. 4 is a block diagram of a system 400 that is configured to automatically select an AV port of a switching device based on a command that indicates electronic device(s) that a user would like to use in accordance with an embodiment. As shown in FIG. 4, system 400 includes electronic devices 402A-402E, a switching device 404 and a control device 406.

Electronic devices 402A-402C are source devices configured to provide audio and/or video signals. Electronic devices 402D and 402E are sink devices configured to receive audio and/or video signals. As shown in FIG. 4, electronic device 402A is a Blu-ray player, electronic device 402B is a set-top box, electronic device 402C is a streaming media player, electronic device 402D is a TV and electronic device 402E is a projector. The depiction of these particular electronics devices is merely for illustrative purposes. Each of electronic devices 402A-402E may be any electronic device capable of providing and/or playing back AV signals.

Switching device 404 may be an example of switching device 104, switching device 204 or switching device 304, as described above in reference to FIGS. 1-3, respectively. As shown in FIG. 4, switching device 404 includes AV ports 410A-410E, a switch circuit 414, a control interface 416, a mapping component 418 and control logic 420. As further shown in FIG. 4, electronic device 402A is coupled to AV port 410A, electronic device 402B is coupled to AV port 410B, electronic device 402C is coupled to AV port 410C, electronic device 402D is coupled to AV port 410D and electronic device 402E is coupled to AV port 410E. AV ports 410A-410C may be automatically configured to be source AV ports, and AV ports 410D and 410E may be automatically configured to be sink AV ports in a similar manner as described above in Subsection A.

Switch circuit 414 may be an example of switch circuit 214 as described above in reference to FIG. 2. Switch circuit 414 may be configured to connect a particular source AV port (e.g., AV ports 410A, 410B, or 410C) to a particular sink AV port (e.g., AV port 410D or AV port 410E) based on one or more commands indicating the electronic device(s) (e.g., electronic devices 402A-402E) that a user would like to use. The command(s) may be received by control interface 416.

Control interface 416 may comprise a receiver configured to receive command(s) that indicate electronic device(s) that a user would like to use for providing and/or presenting content. For example, control interface 416 may be configured to receive such command(s) from control device 406. Control device 406 may be an example of control device 106 as described above in reference to FIG. 1. A user may use control device 406 to select a source device and/or a sink device that the user would like to use for providing and/or presenting content. After making a selection, control device 406 may transmit a command to control interface 416 that includes an identifier of the selected source and/or sink devices. The identifier may include, but is not limited to, the type of the electronic device (e.g., a Blu-ray player, a DVD player, a set-top box, a streaming media player, a TV, a projector etc.), a brand name of the electronic device, a manufacturer of the electronic device, a model number of the electronic device, and/or the like.

In accordance with an embodiment, such commands are received via a wired connection (e.g., via a USB cable, a coaxial cable, etc.). In accordance with another embodiment, such commands are received via a wireless connection (e.g., via IR communication, RF communication, etc.).

Control interface 416 may also be configured to receive one or more voice commands from a user that indicate electronic device(s) (e.g., electronic devices 402A-402E) that a user would like to use for providing and/or presenting content. For example, the user may utter one or more commands or phrases that specify electronic device(s) that the user would like to use (e.g., "Watch DVD," "Watch satellite TV using projector," "Turn on streaming media device"). The command(s) may identify electronic device(s) by one or more of the following: a type of the electronic device, a brand name of the electronic device, a manufacturer of the electronic device, a model number of the electronic device and/or the like. In accordance with an embodiment, control interface 416 may comprise a microphone configured to capture audio signals. In accordance with such an embodiment, control interface 416 and/or another component of switching device 404 is configured to analyze audio signals to detect voice commands included therein. In accordance with another embodiment, the microphone is included in control device 406. In accordance with such an embodiment, control device 406 is configured to analyze the audio signal received by the microphone to detect voice command(s) included therein, identify the electronic device(s) specified by the user, and/or transmit command(s) including identifiers for the identified electronic device(s) to control interface 416. After receiving such command(s), control interface 416 provides the identifier(s) included therein to mapping component 418.

Mapping component 418 may be an example of mapping component 318 as described above in reference to FIG. 3. Mapping component 418 may be configured to identify a source device (e.g., electronic device 402A, electronic device 402B, or electronic device 402C) to be used for providing content and/or a sink device (e.g., electronic device 402D or electronic device 402E) for presenting the content based on the command(s) and/or the identifier(s) included therein. Mapping component 418 may be further configured to identify the AV port(s) to which the identified source device and/or sink device are connected (as described above in Subsection B) and provide identifier(s) to control logic 420 that identifies the identified AV port(s).

Control logic 420 may be an example of control logic 220 as described above in reference to FIG. 2. Based on the identifier(s) received from mapping component 418, control logic 420 may be configured to provide a control signal to switch circuit 414, which causes switch circuit 414 to connect the identified source AV port to the identified and/or determined sink AV port.

Switching device 404 and/or control device 406 may be further configured to transmit a control signal to the source device connected to the identified source AV port and/or the sink device connected to the identified sink AV port that causes the source device and/or sink device to be powered on. In accordance with such an embodiment, a current power state of the source and/or sink device may be determined to determine whether the source and/or sink device is already powered on. If switching device 404 and/or control device 406 determine that the source device and/or sink device are not powered on, switching device 404 and or control device 406 provides the control signal to the source device and/or sink device. Additional details regarding how the power state of an electronic device is determined may be found in U.S. patent application Ser. No. 14,945,201, filed on even date herewith and entitled "Automatic Detection of a Power Status of an Electronic Device and Control Schemes Based Thereon," the entirety of which is incorporated by reference.

Figure 5:
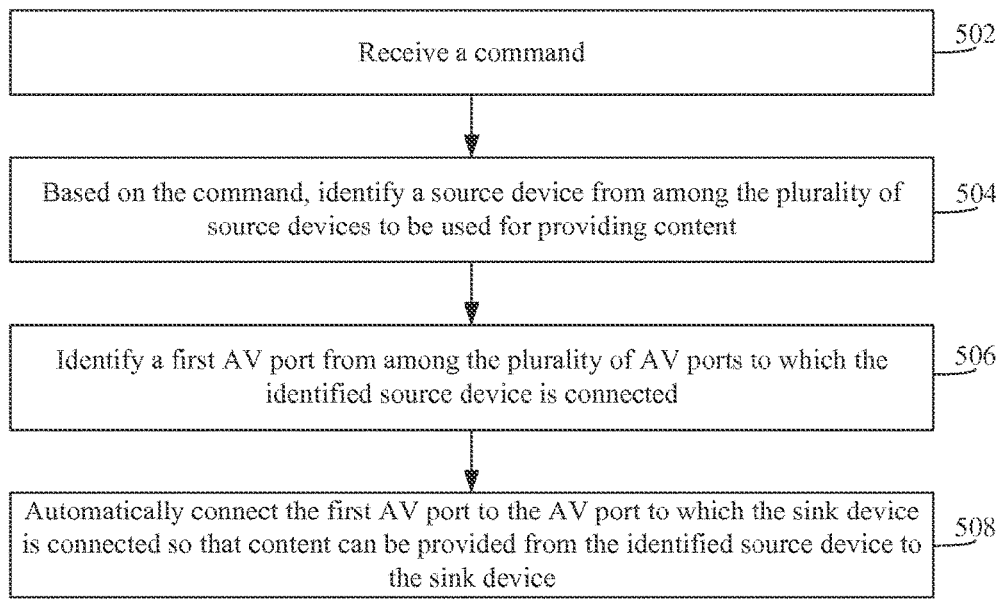
FIG. 5 depicts a flowchart of a method for automatically selecting an AV port based on a command that indicates the electronic device(s) that a user would like to use in accordance with an embodiment.

Accordingly, in embodiments, automatic port selection may be performed based on a command in many ways. For instance, FIG. 5 depicts a flowchart 500 of a method performed by a switching device that performs automatic AV port selection based on a command in accordance with an embodiment. The switching device may comprise a plurality of AV ports and a switch circuit that is operable to selectively connect any one of a plurality of source devices, each of which is connected to a corresponding one of the plurality of AV ports, to a sink device that is connected to another one of the plurality of AV ports. The method of flowchart 500 may be implemented by system 400 as described above in reference to FIG. 4. Other structural and operational embodiments will be apparent to persons skilled in the relevant art(s) based on the following discussion regarding flowchart 500 and system 400.

Flowchart 500 begins with step 502. At step 502, a command is received. For example, with reference to FIG. 4, control interface 416 receives a command. The command may indicate the source device (e.g., electronic device 402A, electronic device 402B, or electronic device 402C) that a user would like to use for providing content. The command may include an identifier of the source device (e.g., a type of the electronic device, a brand name of the electronic device, a manufacturer of the electronic device, a model number of the electronic device and/or the like).

In accordance with an embodiment, the command is a voice command. In accordance with another embodiment, the command originates from a remote control device (e.g., control device 406). The remote-control based command may be received via a wired connection (e.g., via a USB cable, a coaxial cable, etc.) or a wireless connection (e.g., via IR communication, RF communication, etc.).

At step 504, based on the command, a source device is identified from among the plurality of source devices to be used for providing content. For example, with reference to FIG. 4, mapping component 418 may be configured to identify a source device from among the plurality of source devices (e.g., electronic device 402A, electronic device 402B, or electronic device 402C) based on the command received by control device 416.

At step 506, a first AV port from among the plurality of AV ports to which the identified source device is connected is identified. For example, with reference to FIG. 4, mapping component 418 may be configured to identify a first AV port from among the plurality of AV ports (e.g., AV ports 110A-110C) to which the identified source device is coupled. In accordance with an embodiment, the AV ports are HDMI ports.

At step 508, the first AV port is automatically connected to the AV port to which the sink device is connected so that content can be provided from the identified source device to the sink device. For example, with reference to FIG. 4, switch circuit 414 may be configured to automatically connect the first AV port to the AV port to which the sink device is connected. For example, if the first AV port is identified to be AV port 410A, and the sink device to be used for presentation of the content is electronic device 402D, then switch circuit 414 may automatically connect AV port 410A to AV port 410D. Switch circuit 414 may be configured to automatically connect the first AV port to the AV port to which the sink device is connected based on a control signal from control logic 420, which provides the control signal based on the identification of the first AV port by mapping component 418.

In accordance with an embodiment, switching device 404 and/or control device 406 may transmit a control signal to the identified source device that causes the source device to be powered on.

In some example embodiments, one or more of operations 502, 504, 506 and/or 508 of flowchart 500 may not be performed. Moreover, operations in addition to or in lieu of operations 502, 504, 506 and/or 508 may be performed. Further, in some example embodiments, one or more of operations 502, 504, 506 and/or 508 may be performed out of order, in an alternate sequence, or partially (or completely) concurrently with each other or with other operations.

Figure 6:
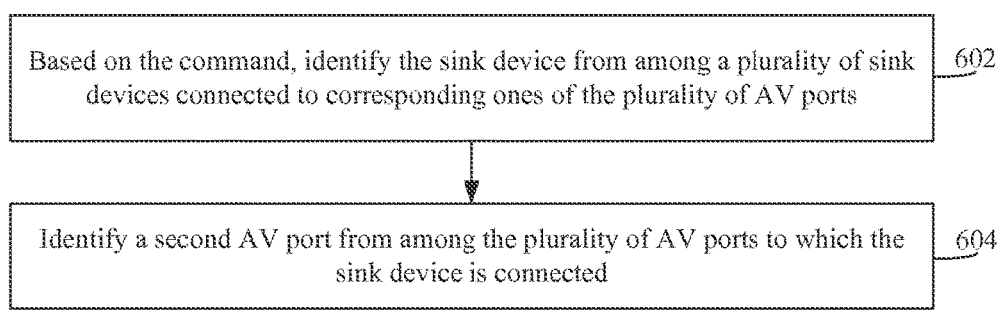
FIG. 6 depicts a flowchart of a method for identifying a sink device from among a plurality of sink devices to which an identified source device is to be connected based on a command in accordance with an embodiment.

In accordance with an embodiment, switching device 404 may be further configured to identify a sink device from among of a plurality of sink devices to which the identified source device is to be connected based on a command (e.g., the command received in step 402). For instance, FIG. 6 depicts a flowchart 600 of a method performed by a switching device that identifies a sink device from among a plurality of sink devices to which the identified source device is to be connected based on a command. The method of flowchart 600 may be implemented by system 400 as described above in reference to FIG. 4. Other structural and operational embodiments will be apparent to persons skilled in the relevant art(s) based on the following discussion regarding flowchart 600 and system 400.

Flowchart 600 begins with step 602. At step 602, based on the command, the sink device from among a plurality of sink devices connected to corresponding ones of the plurality of AV ports is identified. For example, with reference to FIG. 4, mapping component 418 may be configured to identify the sink device from among of plurality of sink devices (e.g., electronic device 402D or electronic device 402E) connected to AV ports 410D and 410E, respectively, based on the command received by control interface 416.

At step 604, a second AV port from among the plurality of AV ports to which the sink device is connected is identified. For example, with reference to FIG. 4, mapping component 418 identifies a second AV port from among the plurality of AV ports (e.g., AV ports 410D or 410E) to which the sink device (e.g., electronic device 402D or electronic device 402E) is connected. After identifying the second AV port, switch circuit 414 may be configured to automatically connect the first AV port to the second AV port. Switch circuit 414 may be configured to automatically connect the first AV port to the second AV port based on a control signal from control logic 420, which provides the control signal based on the identification of the first AV port and the identification of the second AV port by mapping component 418.

In some example embodiments, one or more of operations 602 and/or 604 of flowchart 600 may not be performed. Moreover, operations in addition to or in lieu of operations 602 and/or 604 may be performed. Further, in some example embodiments, one or more of operations 602 and/or 604 may be performed out of order, in an alternate sequence, or partially (or completely) concurrently with each other or with other operations.

Figure 7:
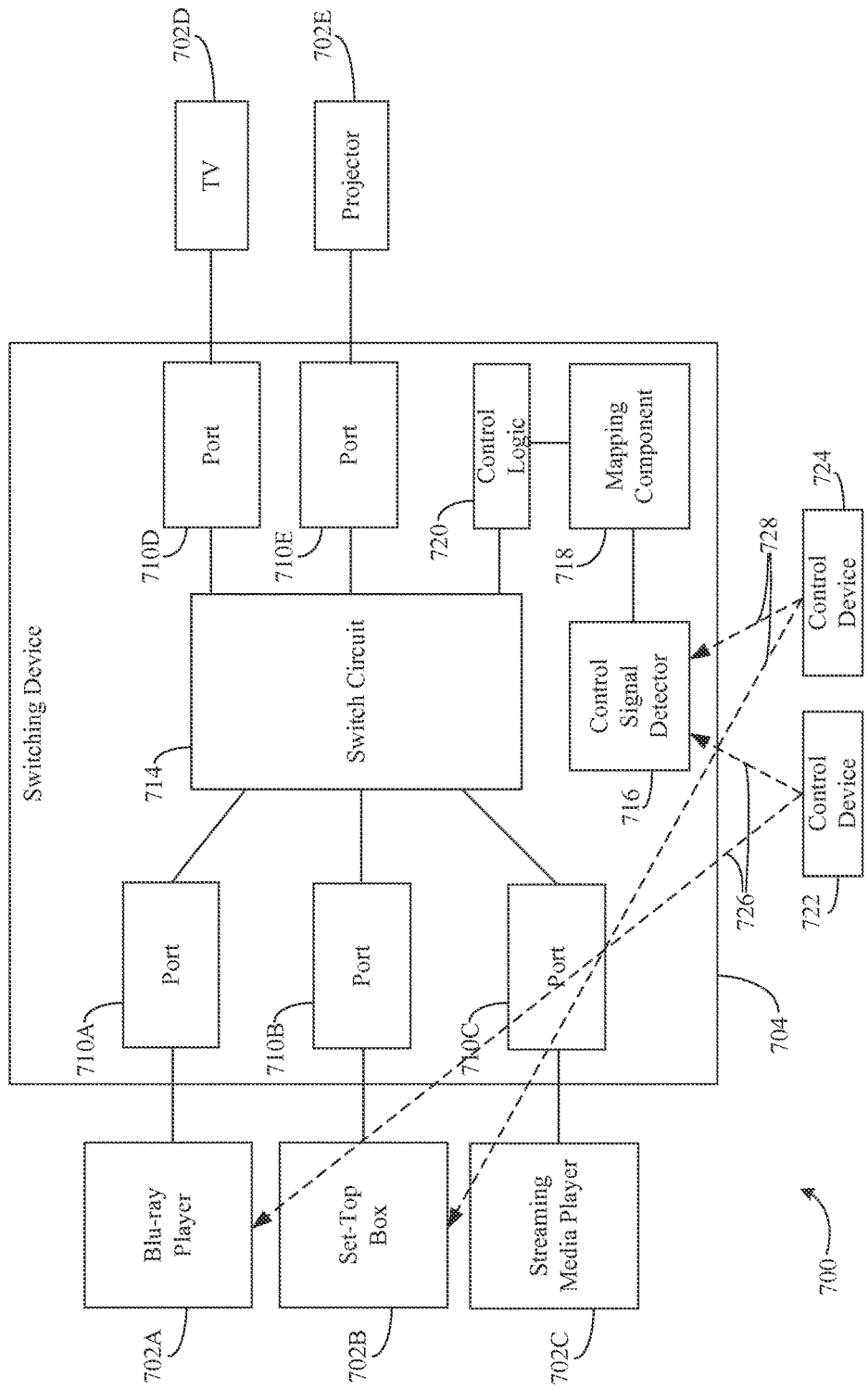
FIG. 7 is a block diagram of a system that is configured to automatically select an AV port based on determining that a particular remote control device is being used in accordance with an embodiment.

2. Automatic Port Selection Based on Determining that a Particular Remote Control Device is Being Used FIG. 7 is a block diagram of a system 700 that is configured to automatically select an AV port of a switching device based on determining that a particular remote control device is being used in accordance with an embodiment. As shown in FIG. 7, system 700 includes electronic devices 702A-702E, a switching device 704, a first control device 722 and a second control device 724.

Electronic devices 702A-702E may be examples of electronic device 402A-402E. Accordingly, electronic devices 702A-702C may be source devices configured to provide audio and/or video signals, and electronic devices 702D and 702E may be sink devices configured to receive audio and/or video signals. As shown in FIG. 7, electronic device 702A is a Blu-ray player, electronic device 702B is a set-top box, electronic device 702C is a streaming media player, electronic device 702D is a TV and electronic device 702E is a projector. The depiction of these particular electronics devices is merely for illustrative purposes. Each of electronic device 702A-702E may be any electronic device capable of providing and/or playing back AV signals.

Switching device 704 may be an example of switching device 404 as described above in reference to FIG. 4. As shown in FIG. 7, switching device 704 includes AV ports 710A-710E, a switch circuit 714, a control signal detector 716, a mapping component 718 and control logic 720. As further shown in FIG. 7, electronic device 702A is coupled to AV port 710A, electronic device 702B is coupled to AV port 710B, electronic device 702C is coupled to AV port 710C, electronic device 702D is coupled to AV port 710D and electronic device 702E is coupled to AV port 710E. AV ports 710A-710C may be automatically configured to be source AV ports, and AV ports 710D and 710E may be automatically configured to be sink AV ports in a similar manner as described above in Subsection A.

Switch circuit 714 may be an example of switch circuit 414 as described above in reference to FIG. 4. Switch circuit 714 may be configured to connect a particular source AV port (e.g., AV ports 710A, 710B, or 710C) to a particular sink AV port (e.g., AV port 710D or AV port 710E) based on a determination that a particular remote control device (e.g., control device 722 or control device 724) is being used.

For example, control device 722 may be a remote control device that is configured to operate one of electronic devices 702A-702E, and control device 724 may be a remote control device that is configured to operate another one of electronic device 702A-702E. Each of control device 722 and 724 may be configured to operate a particular electronic device by transmitting a control signal to that electronic device. For illustrative purposes, control device 722 is configured to operate electronic device 702A and, thus, is shown transmitting a control signal 726 to electronic device 702A, and control device 724 is configured to operate electronic device 702B, and thus is shown transmitting a control signal 728 to electronic device 702B. It is noted that system 700 may comprise additional remote control device(s) that are operable to control other electronic device(s) (e.g., electronic device 702C, electronic device 702D, or electronic device 702E).

Control signal detector 716 may be configured to detect (e.g., "sniff") control signals 726 and 728 transmitted by control devices 722 and 724, respectively, and determine that a remote control device is being used. Control signal detector 716 may be further configured to identify one or more identifier(s) in control signal 726 or 728 that uniquely identifies the electronic device being operated. Control signal detector 716 may provide the identifier(s) to mapping component 718.

In accordance with one or more embodiments, control signal detector 416 receives control signals 726 and 728 via a wired connection (e.g., via a USB cable, a coaxial cable, etc.). In accordance with another embodiment, control signal detector 716 receives control signals 726 and 728 via a wireless connection (e.g., via IR communication, RF communication, etc.).

Mapping component 718 may be an example of mapping component 418 as described above in reference to FIG. 4. Mapping component 718 may be configured to identify a source device (e.g., electronic device 702A, electronic device 702A, or electronic device 702C) to be used for providing content and/or a sink device (e.g., electronic device 702D or electronic device 702E) for presenting the content based on the identifier(s) provided by control signal detector 716. Mapping component 718 may be further configured to identify the AV port(s) to which the identified source device and/or sink device are connected (as described above in Subsection B) and provide an identifier to control logic 720 that identifies the identified AV port(s).

Control logic 720 may be an example of control logic 420 as described above in reference to FIG. 4. Based on the identifier(s) received from mapping component 718, control logic 720 may be configured to provide a control signal to switch circuit 714, which causes switch circuit 714 to connect the identified source AV port to the identified and/or determined sink AV port.

Switching device 704 and/or a control device (e.g., control device 722, control device 724, or another control device (e.g., control device 406, as described above in reference to FIG. 4)) may be further configured to transmit a control signal to the source device connected to the identified source AV port and/or the sink device connected to the identified sink AV port that causes the source device and/or sink device to be powered on. In accordance with such an embodiment, a current power state of the source and/or sink device may be determined to determine whether the source and/or sink device is already powered on. If switching device 704 and/or the control device determine that the source device and/or sink device are not powered on, switching device 704 and/or the control device provide the control signal to the source device and/or sink device. Additional details regarding how the power state of an electronic device is determined may be found in U.S. patent application Ser. No. 14/945,201, filed on even date herewith and entitled "Automatic Detection of a Power Status of an Electronic Device and Control Schemes Based Thereon," the entirety of which is incorporated by reference.

Figure 8:
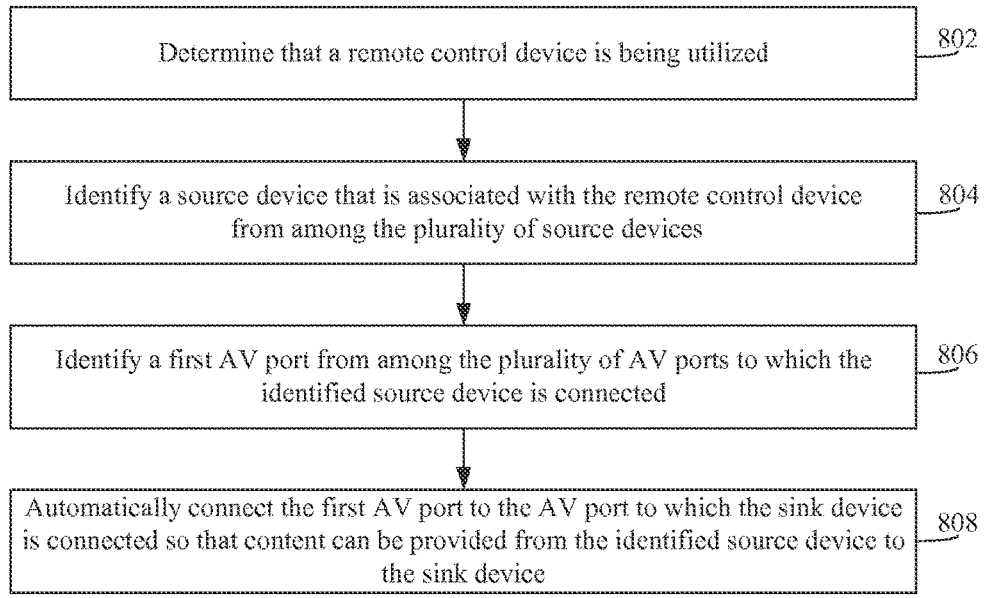
FIG. 8 depicts a flowchart of a method for automatically selecting an AV port based on determining that a particular remote control device is being used in accordance with an embodiment.

Accordingly, in embodiments, automatic port selection may be performed based on determining that a particular remote control device is being used in many ways. For instance, FIG. 8 depicts a flowchart 800 of a method performed by a switching device that performs automatic port selection based on determining that a particular remote control device is being used in accordance with an embodiment. The switching device may comprise a plurality of AV ports and a switch circuit that is operable to selectively connect any one of a plurality of source devices, each of which is connected to a corresponding one of the plurality of AV ports, to a sink device that is connected to another one of the plurality of AV ports. The method of flowchart 800 may be implemented by system 700 as described above in reference to FIG. 7. Other structural and operational embodiments will be apparent to persons skilled in the relevant art(s) based on the following discussion regarding flowchart 800 and system 700.

Flowchart 800 begins with step 802. At step 802, a determination is made that a remote control device is being utilized. For example, with reference to FIG. 7, control signal detector 716 determines that a control device (e.g., control device 722) is being used. For example, control signal detector 716 may receive control signal 726, which is intended for a particular electronic device (e.g., electronic device 702A) and may determine that control device 722 is being used in response to receiving control signal 726. In accordance with an embodiment, the control signal is received via a wired connection (e.g., via a USB cable, a coaxial cable, etc.). In accordance with another embodiment, the control signal is received in accordance with at least one of an IR-based transmission scheme, an RF-based transmission scheme, or an IP-based transmission scheme.

At step 804, a source device that is associated with the remote control device is identified from among the plurality of source devices. For example, with reference to FIG. 7, mapping component 718 may be configured to identify a source device from among the plurality of source devices (e.g., electronic device 702A, electronic device 702B, or electronic device 702C) that is associated with control device 722. For example, control signal detector 716 may detect and provide an indicator included in control signal 726 that uniquely identifies the source device (e.g., electronic device 702A) to mapping component 718. Mapping component 718 may identify the source device based on the indicator.

At step 806, a first AV port from among the plurality of AV ports to which the identified source device is connected is identified. For example, with reference to FIG. 7, mapping component 718 may be configured to identify a first AV port from among the plurality of AV ports (e.g., AV ports 110A-110C) to which the identified source device is coupled based on the source device identified by control signal detector 716. In accordance with an embodiment, the AV ports are HDMI ports.

At step 808, the first AV port is automatically connected to the AV port to which the sink device is connected so that content can be provided from the identified source device to the sink device. For example, with reference to FIG. 7, switch circuit 714 may be configured to automatically connect the first AV port to the AV port to which the sink device is connected. For example, if the first AV port is identified to be AV port 710A, and the sink device to be used for presentation of the content is electronic device 702D, then switch circuit 714 may automatically connect AV port 710A to AV port 710D. Switch circuit 714 may be configured to automatically connect the first AV port to the AV port to which the sink device is connected based on a control signal from control logic 720, which provides the control signal based on the identification of the first AV port by mapping component 718.

In accordance with an embodiment, switching device 704 may transmit a control signal to the identified source device that causes the identified source device to be powered on.

In some example embodiments, one or more of operations 802, 804, 806 and/or 808 of flowchart 800 may not be performed. Moreover, operations in addition to or in lieu of operations 802, 804, 806 and/or 808 may be performed. Further, in some example embodiments, one or more of operations 802, 804, 806 and/or 808 may be performed out of order, in an alternate sequence, or partially (or completely) concurrently with each other or with other operations.

Figure 9:
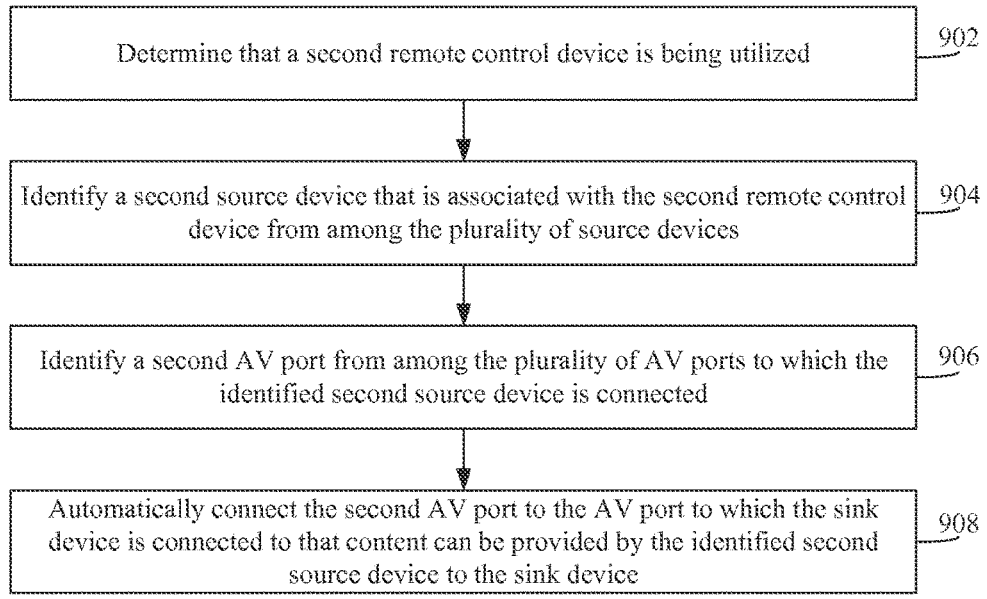
FIG. 9 depicts a flowchart of a method for automatically switching from a first AV port to a second AV port in accordance with an embodiment.

In accordance with an embodiment, switching device 704 may be further configured to automatically switch from the first AV port to a second AV port. For instance, FIG. 9 depicts a flowchart 900 of a method performed by a switching device that automatically switches from the first AV port to a second AV port in accordance with an embodiment. The method of flowchart 900 may be implemented by system 700 as described above in reference to FIG. 7. Other structural and operational embodiments will be apparent to persons skilled in the relevant art(s) based on the following discussion regarding flowchart 900 and system 700.

Flowchart 900 begins with step 902. At step 902, a determination is made that a second remote control device is being utilized. For example, with reference to FIG. 7, control signal detector 716 determines that control device 724 is being used. For example, control signal detector 716 may receive control signal 728, which is intended for a particular electronic device (e.g., electronic device 702B) and may determine that control device 724 is being used in response to receiving control signal 728. In accordance with an embodiment, control signal 728 is received via at least one of an IR-based transmission scheme, an RF-based transmission scheme, or an IP-based transmission scheme.

At step 904, a source device that is associated with the remote control device is identified from among the plurality of source devices. For example, with reference to FIG. 7, mapping component 718 may be configured to identify a source device from among the plurality of source devices (e.g., electronic device 702A, electronic device 702B, or electronic device 702C) that is associated with control device 724. For example, control signal detector 716 may detect and provide an indicator included in control signal 728 that uniquely identifies the source device (e.g., electronic device 702B) to mapping component 718. Mapping component 718 may identify the source device based on the indicator.

At step 906, a second AV port from among the plurality of AV ports to which the identified second source device is connected is identified. For example, with reference to FIG. 7, mapping component 718 may be configured to identify a second AV port from among the plurality of AV ports (e.g., AV ports 110A-110C) to which the identified second source device is coupled based on the second source device identified by control signal detector 716.

At step 908, the second AV port is automatically connected to the AV port to which the sink device is connected so that content can be provided from the identified second source device to the sink device. For example, with reference to FIG. 7, switch circuit 714 may be configured to automatically connect the second AV port to the AV port to which the sink device is connected (and automatically disconnect the first AV port from the AV port to which the sink device is connected). For example, if the second AV port is identified to be AV port 710B, and the sink device to be used for presentation of the content is electronic device 702E, then switch circuit 714 may automatically connect AV port 710B to AV port 710E. Switch circuit 714 may be configured to automatically connect the second AV port to the AV port to which the sink device is connected based on a control signal from control logic 720, which provides the control signal based on the identification of the second AV port by mapping component 718.

In accordance with an embodiment, switching device 704 may transmit a control signal to the identified second source device that causes the identified second source device to be powered on.

In some example embodiments, one or more of operations 902, 904, 906 and/or 908 of flowchart 900 may not be performed. Moreover, operations in addition to or in lieu of operations 902, 904, 906 and/or 908 may be performed. Further, in some example embodiments, one or more of operations 902, 904, 906 and/or 908 may be performed out of order, in an alternate sequence, or partially (or completely) concurrently with each other or with other operations.

3. Automatic Port Selection Based on Content Selection

Figure 10:
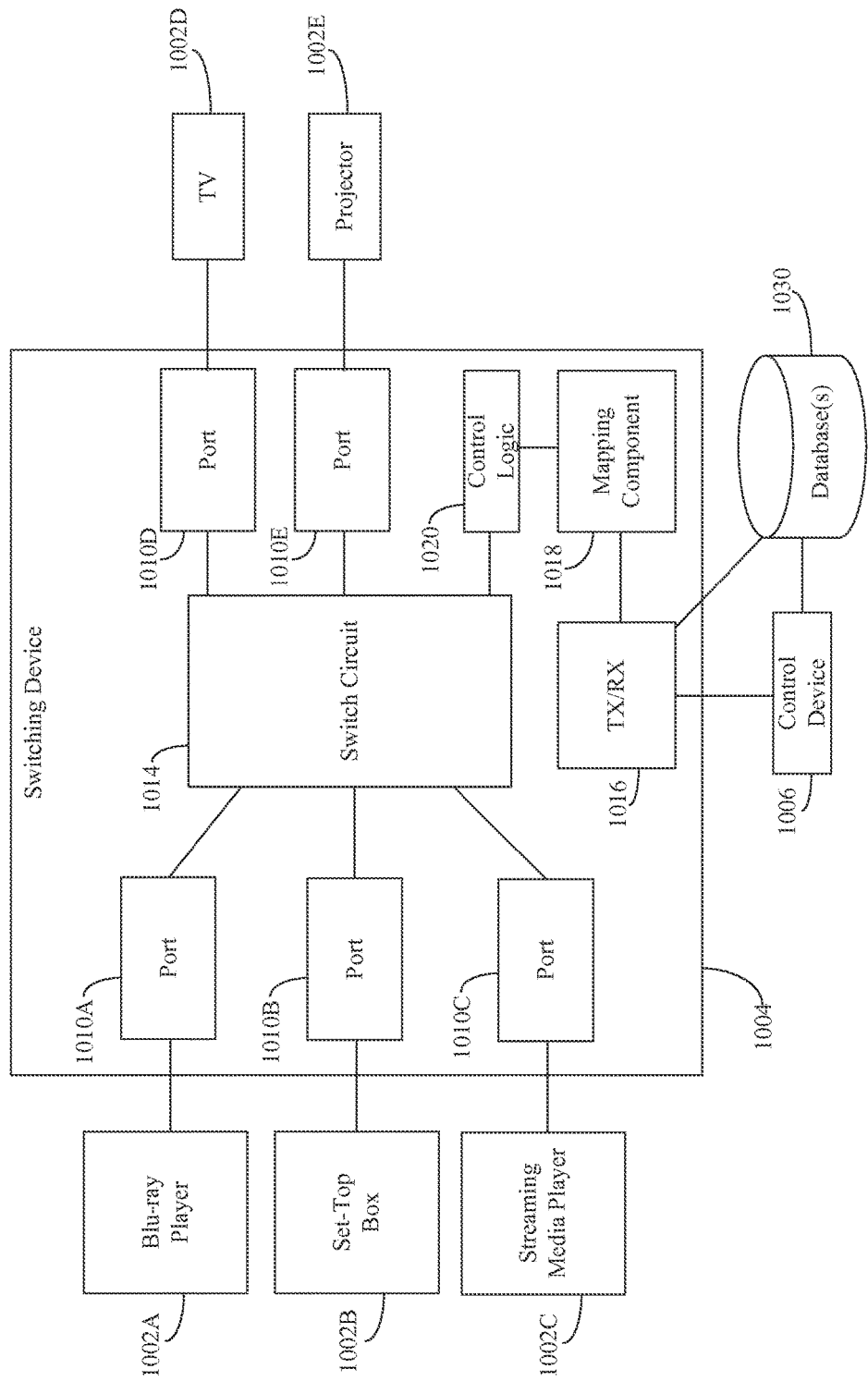
FIG. 10 is a block diagram of a system that is configured to automatically select an AV port based on content selection in accordance with an embodiment.

FIG. 10 is a block diagram of a system 1000 that is configured to automatically select an AV port of a switching device based on content selection in accordance with an embodiment. As shown in FIG. 10, system 1000 includes electronic devices 1002A-1002E, a switching device 1004, a control device 1006 and one or more databases 1030.

Electronic devices 1002A-1002E may be examples of electronic device 702A-702E. Accordingly, electronic devices 1002A-1002C may be source devices configured to provide audio and/or video signals, and electronic devices 1002D and 1002E may be sink devices configured to receive audio and/or video signals. As shown in FIG. 10, electronic device 1002A is a Blu-ray player, electronic device 1002B is a set-top box, electronic device 1002C is a streaming media player, electronic device 1002D is a TV and electronic device 1002E is a projector. The depiction of these particular electronics devices is merely for illustrative purposes. Each of electronic device 1002A-1002E may be any electronic device capable of providing and/or playing back AV signals.

Switching device 1004 may be an example of switching device 704 as described above in reference to FIG. 7, respectively. As shown in FIG. 10, switching device 1004 includes AV ports 1010A-1010E, a switch circuit 1014, a control interface 1016, a mapping component 1018 and control logic 1020. As further shown in FIG. 10, electronic device 1002A is coupled to AV port 1010A, electronic device 1002B is coupled to AV port 1010B, electronic device 1002C is coupled to AV port 1010C, electronic device 1002D is coupled to AV port 1010D and electronic device 1002E is coupled to AV port 1010E. AV ports 1010A-1010C may be automatically configured to be source AV ports, and AV ports 1010D and 1010E may be automatically configured to be sink AV ports in a similar manner as described above in Subsection A.

Switch circuit 1014 may be an example of switch circuit 714 as described in reference to FIG. 7. Switch circuit 1014 may be configured to connect a particular source AV port (e.g., AV ports 1010A, 1010B, or 1010C) to a particular sink AV port (e.g., AV port 1010D or AV port 1010E) based on content selection.

For example, control device 1006 and/or switching device 1004 may be operable to enable a user to search for and/or select a particular piece of content for viewing and/or listening by the user. For instance, switching device 1004 may cause a GUI to be rendered via a display device coupled thereto (e.g., electronic device 1002D or electronic device 1002E) that displays a listing of content available for viewing and/or listening. Alternatively, the GUI may be rendered and controllable via a display included in control device 1006. The listing of available content may be provided via one or more content providing service(s) made available via any of the electronic devices 1002A-1002C (e.g., a satellite TV service, cable TV service, or a software application, such as Netflix™, Hulu™, HBO Go™, YouTube™, Amazon Prime™, etc.).

For example, after switching device 1004 identifies the source electronic devices (e.g., electronic devices 1002A-1002C) that are connected to each AV ports 1010A-1010C of switching device 1004 (as described above in subsection B), one or more components of switching device 1004 (e.g., mapping component 1018) and/or control device 1006 may be configured to determine the content providing service(s) made available by each of electronic devices 1002A-1002C. In accordance with an embodiment, switching device 1004 and/or control device 1006 access a database (not shown) that specifies the content providing service(s) made available by any given electronic device. The database may be stored locally to or remotely from switching device 1004 and/or control device 1006. In accordance with another embodiment, switching device 1004 and/or control device 1006 may query each of source electronic devices 1002A-1002C coupled thereto to determine the content providing service(s) made available by each of electronic devices 1002A-1002C.

After determining the content providing service(s) made available by each of electronic device(s) 1002A-1002C, a user may perform a search across all of the determined content providing service(s) for a particular piece of content using the GUI. For example, one or more database(s) 1032 containing a listing of content available from the content providing service(s) may be searched. In accordance with an embodiment, database(s) 1032 may comprise respective database(s) maintained by each of the content providing service(s). In accordance with another embodiment, database(s) 1032 comprises a database that is periodically populated with listings of contents from each the respective database(s) of each of the content providing service(s). In response to performing the search, a listing of content that at least substantially matches the searched for content is returned and displayed to the user (e.g., via electronic device 1002D, electronic device 1000E or control device 1006). A user may be able to select a particular piece of content from the returned listing. After selecting a particular piece of content, switching device 1004 and/or control device 1006 may automatically determine which content providing service is available for providing that content. In the event that more than one content providing service is available, one or more components of switching device 1004 (e.g., mapping component 1018) and/or control device 1006 may automatically select the content providing service based on a prioritization scheme. For example, the prioritization scheme may be based on the cost for providing the content by each of the content providing service(s). As another example, the prioritization scheme may be based on which service can provide the highest quality version of the content. It is noted that these are just a few prioritization scheme examples and that other prioritization schemes may be used.

After determining the content service provider(s), component(s) of switching device 1004 (e.g., mapping component 1018) and/or control device 1006 may determine the electronic device(s) from which the content service provider is made available. In the event that a single electronic device is determined, mapping component 1018 may determine the AV port to which the single electronic device is coupled to and cause switch circuit 1014 to automatically select the determined AV port (in a similar manner as described above in reference to FIG. 7). In the event that more than one electronic device is determined, mapping component 1018 may determine which electronic device to use based on a user specifying which electronic devices are to use which content providing services during a setup process. For example, during the setup process, the user may specify that Netflix content should be provided by a Chromecast, and that Hulu content should be provided by a Roku device. Alternatively, mapping component 1018 may determine which electronic device to use based on a prioritization scheme. The prioritization scheme may be based on the cost for providing the content by each of the content providing service(s), the quality (e.g., standard definition, high definition, ultra-high definition, etc.) of the content provided by each content providing service(s), etc. It is noted that these prioritization schemes are just a few examples and that other prioritization schemes may be used. After automatically determining which electronic device among the electronic device(s) is to provide the content, mapping component 1018 may determine the AV port to which the determined electronic device is coupled to and cause switch circuit 1014 to automatically select the determined AV port (in a similar manner as described above in reference to FIG. 7).

Switching device 1004 and/or control device 1006 may be further configured to transmit a control signal to the source device connected to the identified source AV port that causes the source device to be powered on. In accordance with such an embodiment, a current power state of the source device may be determined to determine whether the source device is already powered on. If switching device 1004 and/or control device 1006 determine that the source device is not powered on, switching device 1004 and or control device 1006 provide the control signal. Additional details regarding how the power state of an electronic device is determined may be found in U.S. patent application Ser. No. 14,945,201, filed on even date herewith and entitled "Automatic Detection of a Power Status of an Electronic Device and Control Schemes Based Thereon," the entirety of which is incorporated by reference.

Figure 11:
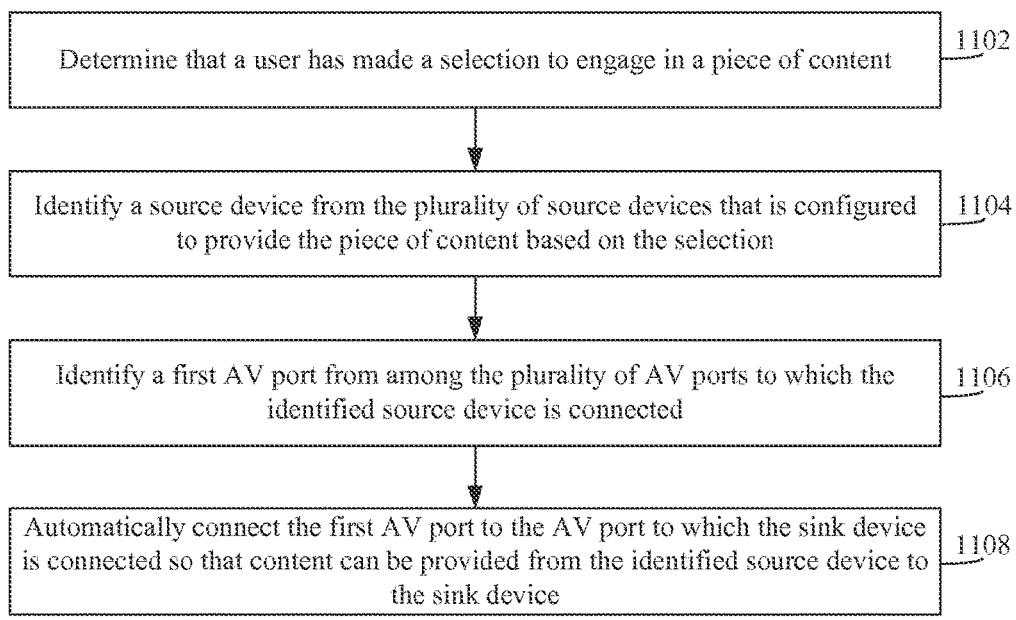
FIG. 11 depicts a flowchart of a method for automatically selecting an AV port based on content selection in accordance with an embodiment.

Accordingly, in embodiments, automatic port selection may be performed based on content selection in many ways. For instance, FIG. 11 depicts a flowchart 1100 of a method performed by a switching device that performs automatic port selection based on content selection. The switching device may comprises a plurality of AV ports and a switch circuit that is operable to selectively connect any one of a plurality of source devices, each of which is connected to a corresponding one of the plurality of AV ports, to a sink device that is connected to another one of the plurality of AV ports. The method of flowchart 1100 may be implemented by system 1000 as described above in reference to FIG. 10. Other structural and operational embodiments will be apparent to persons skilled in the relevant art(s) based on the following discussion regarding flowchart 1100 and system 1000.

Flowchart 1100 begins with step 1102. At step 1102, a determination is made that a user has made a selection to engage in a piece of content. For example, with reference to FIG. 10, switching device 1004 may determine that a user has made a selection to engage in a piece of content. The selection may be made via a GUI that is rendered on a display device (e.g., electronic device 1002E or electronic device 1002F) or on control device 1006.

At step 1104, a source device is identified from among the plurality of source devices that is configured to provide the piece of content based on the selection. For example, with reference to FIG. 10, mapping component 1018 may be configured to identify a source device from among the plurality of source devices (e.g., electronic device 402A, electronic device 402B, or electronic device 402C) that is configured to provide the piece of content.

At step 1106, a first AV port from among the plurality of AV ports to which the identified source device is connected is identified. For example, with reference to FIG. 10, mapping component 1018 may be configured to identify a first AV port from among the plurality of AV ports (e.g., AV ports 1010A-1010C) to which the identified source device is coupled. In accordance with an embodiment, the AV ports are HDMI ports.

At step 1108, the first AV port is automatically connected to the AV port to which the sink device is connected so that content can be provided from the identified source device to the sink device. For example, with reference to FIG. 10, switch circuit 1014 may be configured to automatically connect the first AV port to the AV port to which the sink device is connected. For example, if the first AV port is identified to be AV port 1010A, and the sink device to be used for presentation of the content is electronic device 1002D, then switch circuit 1014 may automatically connect AV port 1010A to AV port 1010D. Switch circuit 1014 may be configured to automatically connect the first AV port to the AV port to which the sink device is connected based on a control signal from control logic 1020, which provides the control signal based on the identification of the first AV port by mapping component 1018.

In accordance with an embodiment, switching device 1004 may transmit a control signal to the identified source device that causes the identified source device to be powered on.

In some example embodiments, one or more of operations 1102, 1104, 1106 and/or 1108 of flowchart 1100 may not be performed. Moreover, operations in addition to or in lieu of operations 1102, 1104, 1106 and/or 1108 may be performed. Further, in some example embodiments, one or more of operations 1102, 1104, 1106 and/or 1108 may be performed out of order, in an alternate sequence, or partially (or completely) concurrently with each other or with other operations.

Figure 12:
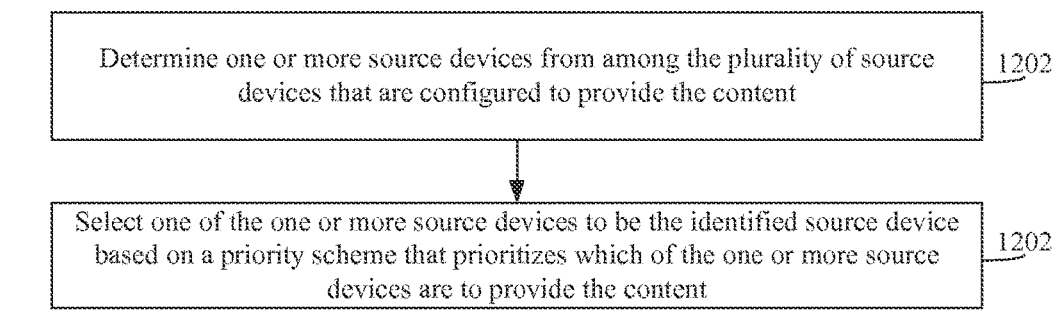
FIG. 12 depicts a flowchart of a method for identifying a source device from among a plurality of source devices that is configured to provide a piece of content based on a selection made by a user in accordance with an embodiment.

In accordance with one or more embodiments, step 1104 may be carried out according to the process shown in FIG. 12. The method of flowchart 1200 may be implemented by system 1000 as described above in reference to FIG. 10. Other structural and operational embodiments will be apparent to persons skilled in the relevant art(s) based on the following discussion regarding flowchart 1200 and system 1000. Flowchart 1200 is described as follows.

Flowchart 1200 begins with step 1202. At step 1202, one or more source devices from among the plurality of source devices that are configured to provide the content are determined For example, with reference to FIG. 10, mapping component 1018 may be configured to determine one or more source devices from among the plurality of source devices (e.g., electronic devices 1010A-1010C) that are configured to provide the content.

At step 1204, one of the one or more source devices is selected to be the identified source device based on a prioritization scheme that prioritizes which of the one or more source devices are to provide the content. For example, with reference to FIG. 10, mapping component 1018 selects the one of the one or more source devices to be the identified source based on the prioritization scheme. The prioritization scheme may be based on the cost for providing the content by each of the content providing service(s), the quality (e.g., standard definition, high definition, ultra-high definition, etc.) of the content provided by each content providing service(s), etc. It is noted that these prioritization schemes are just a few examples and that other prioritization schemes may be used.

In some example embodiments, one or more of operations 1202 and/or 1204 of flowchart 1200 may not be performed. Moreover, operations in addition to or in lieu of operations 1202 and/or 1204 may be performed. Further, in some example embodiments, one or more of operations 1202 and/or 1204 may be performed out of order, in an alternate sequence, or partially (or completely) concurrently with each other or with other operations.

Additional Embodiments

The switching devices and/or the control devices described above (e.g., switching devices 104, 204, 304, 404, 704 and 1004, as described above in reference to FIGS. 1-4, 7 and 10, respectively and/or control devices 106, 406 and 1006, as described above in reference to FIGS. 1, 4 and 10, respectively) may be further operable to identify a room setup of a particular room and tailor the user interface, controls of the control device and content discovery and provisioning accordingly. For example, a control device may be configured to be operable with multiple switching devices, each being situated in a different area (e.g., a room) of a dwelling (e.g., a house, a building, etc.). Electronic devices (e.g., electronic devices 102A-102C, electronic devices 202A and 202B, electronic devices 402A-402E, electronic devices 702A-702E and electronic devices 1002A-1002E, as described above in reference to FIGS. 1, 2, 4, 7 and 10, respectively) or the switching device of that room may be configured to transmit information to the control device. Such information may include Wi-Fi signal strength or beacons. In accordance with an embodiment, the beacon may be a determined power state of a particular electronic device that is provided by a USB dongle plugged into a USB port of that electronic device. Additional details regarding providing a determined power state of an electronic device via a USB dongle may be found in U.S. patent application Ser. No. 14/945,201, filed on even date herewith and entitled "Automatic Detection of a Power Status of an Electronic Device and Control Schemes Based Thereon," the entirety of which is incorporated by reference herein.

Using the received information, the control device may determine which area it is situated in. For example, if the received Wi-Fi signal strengths and/or beacons from a first area are stronger than a second area, the control device may determine that it is situated in the first area. Once the control device determines that it is in a particular area, the switching device of that area may provide the control device with information regarding the number of electronic devices in that area, the type(s) of electronic devices in that area, and/or how each of the electronic devices are communicatively coupled to each other via the switching device (e.g., by providing the device-to-port mapping as described above in Subsection B).

Using this information, the control device may update its GUI/functionality to reflect the electronic devices that are in that area. For example, the GUI may selectively display controls pertaining to only the electronic device(s) that are in the determined area and/or enable a user to search for content that is only provided by the electronic device(s) (and/or the software application(s) included thereon) that are located in the determined area.

The switching device of any given area and/or the control device may also be operable to determine information for each user of the remote. Such information may include demographic information associated with each user, such as age, gender, etc., viewing preferences, such as the type of content viewed most often (e.g., kids movies, sporting events, etc.), the type of electronic device(s) used to view and/or listen to content (e.g., via a streaming media player, via a Blu-ray player, and/or the like), etc. Using this information, the control device may update its GUI/functionality to reflect this determined information. For example, the GUI may enable a user to search for content based on the user's demographics, the type of content viewed most often and/or the type of electronic device(s) used to view and/or listen to content.

Control Device Embodiments

Figure 13A:
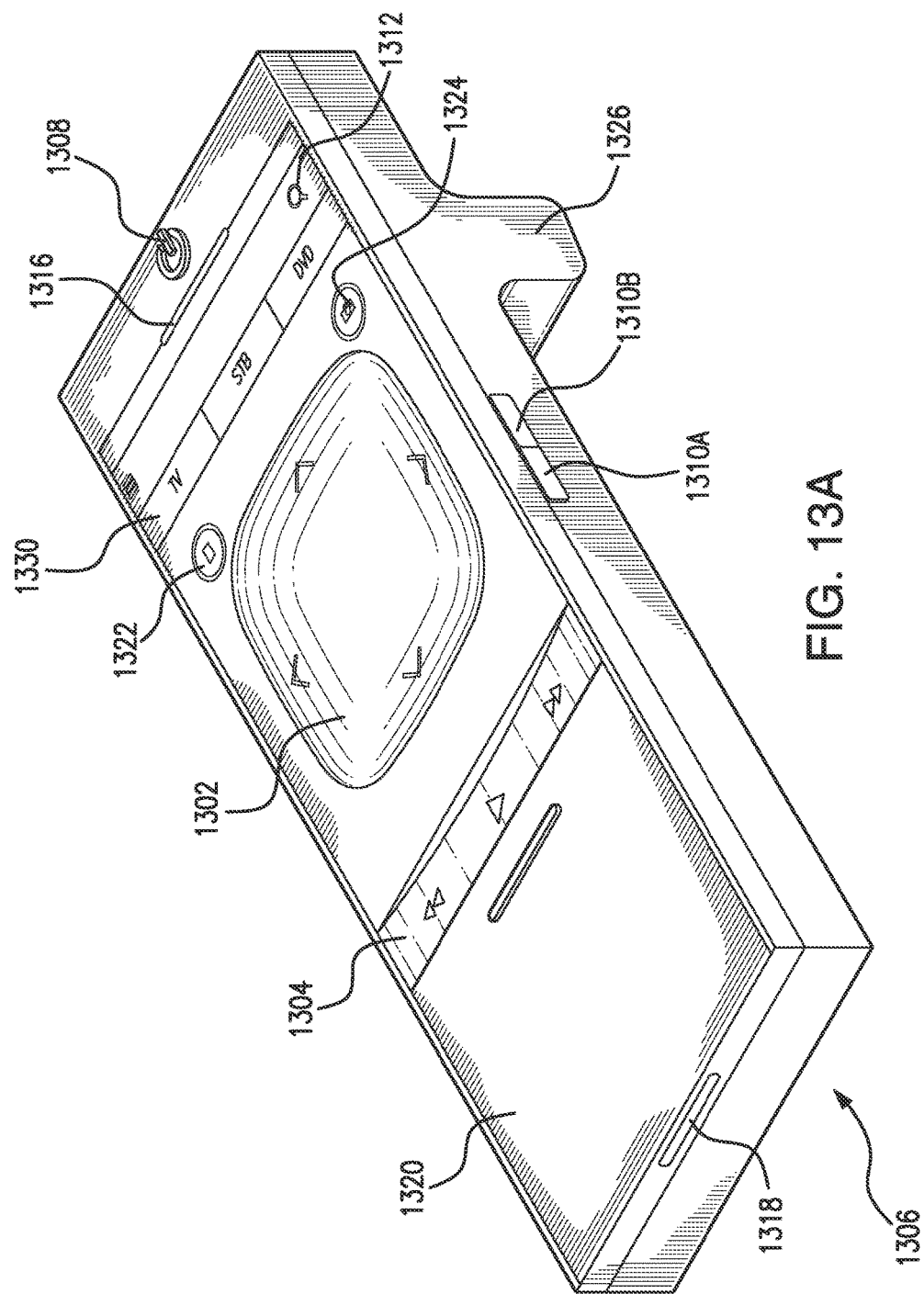
FIG. 13A is a perspective view of a control device in accordance with an embodiment.
Figures 13B, 13C, 13D:
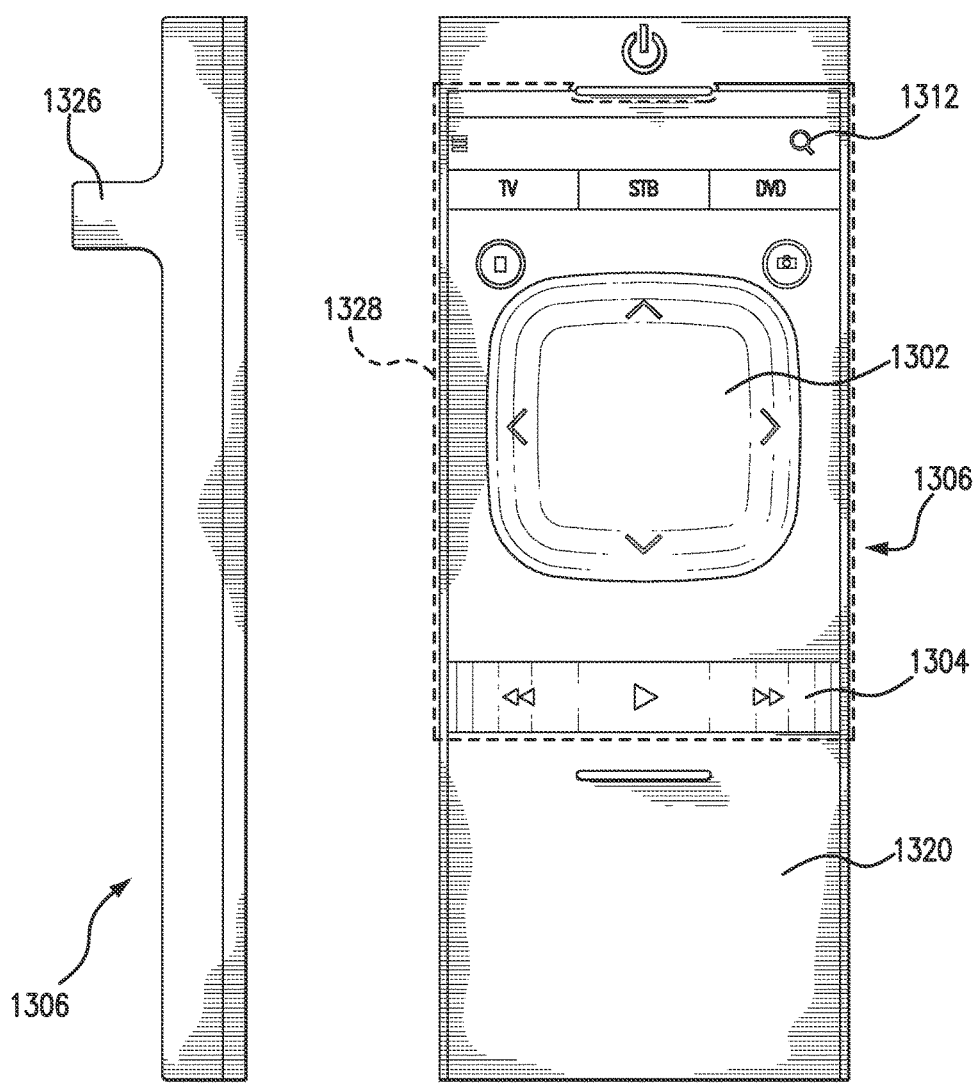
FIG. 13B is a top view of the control device shown in FIG. 13A.
FIG. 13C is a left side view of the control device shown in FIG. 13B.
FIG. 13D is a front view of the control device shown in FIG. 13B.

FIGS. 13A-13H describe various aspects of the control devices described above (e.g., control devices 106, 406 and 1006, as described above in reference to FIGS. 1, 4 and 10, respectively). FIG. 13A is a perspective view of a control device 1306 in accordance with an embodiment. FIG. 13B is a top view of control device 1306 shown in FIG. 13A. FIG. 13C is a left side view of control device 1306 shown in FIG. 13B. FIG. 13D is a front view of control device 1306 shown in FIG. 13B. FIG. 13E is a bottom view of control device 1306 shown in FIG. 13B. FIG. 13F is a left side view of control device 1306 shown in FIG. 13B. FIG. 13G is a perspective view of a charging device 1350 configured to charge control device 1306 shown in FIGS. 13A-13F in accordance with an embodiment. FIG. 134H is a left side view of control device 1306 when coupled to charging device 1350.

As shown in FIG. 13B, control device 1306 comprises a capacitive touch display screen 1328. As shown in FIGS. 13A and 13B, capacitive touch display screen 1328 may display one or more interface elements (e.g., icons, buttons, etc.) 1312, 1330, 1322, 1324. Interface element 1312 enables a user to perform a search for content that the user would like to watch and/or listen to (e.g., in a similar manner as described above in reference to FIG. 10). Capacitive touch display screen 1328 also has one or more sculpted features (e.g., concave features 1302 and 1304), which each display additional interface elements. Concave features 1302 and 1304 advantageously enable a user to navigate to different portions of control device 1306 without having to look at control device 1306. Interface element 1330 may enable a user to select between different electronic device(s) (e.g., electronic devices 102A-102C, electronic devices 202A and 202B, electronic devices 402A-402E, electronic devices 702A-702E and electronic devices 1002A-1002E, as described above in reference to FIGS. 1, 2, 4, 7 and 10, respectively). Upon selecting a particular electronic device, capacitive touch display screen 1328 may display interface element(s) specific to the selected electronic device. For example, one or more of interface elements 1312, 1322 and 1324 and/or the interface elements displayed in sculpted features 1302 and 1304 may differ depending on the selected electronic device. As also shown in FIG. 13A, control device 1306 may comprise one or more physical interface elements, such as, but no limited to, a power button 1308, a volume up button 1310B, a volume down button 1310A and a cantilever button 1320.

In accordance with one or more embodiments, one or more of interface elements 1312, 1322, 1324, 1330 and/or the interface elements displayed via concave features 1302 and/or 1304 may be activated when pressed (e.g., such interface elements may be click-sensitive), rather than simply being touched. This advantageously enables control device 1306 to unambiguously determine that a user intended to activate such interface element(s) instead of accidentally touching such interface element(s).

In accordance with one or more embodiments, one or more of interface elements 1312, 1322, 1324, 1330 and/or the interface elements displayed via concave features 1302 and/or 1304 may provide tactile feedback when activated.

As further shown in FIG. 13A, control device 1306 comprises a speaker 1316 and a microphone 1318. Volume up button 1310B and volume down button 1310A may be configured to control the volume of speaker 1316 and/or the volume of a sink device (e.g., electronic device 102D, sink device(s) 302B, electronic device 402D, electronic device 402E, electronic device 702D, electronic device 702E, electronic device 1002D or projector electronic device, as described above in reference to FIGS. 1, 3, 4, 7 and 10, respectively). Microphone 1318 may be configured to receive and/or detect voice commands from the user, which may be used to automatically select an AV port as described above in reference to Subsection C.1.

As shown in FIG. 13D, control device 1306 includes an IR transmitter 1332 for transmitting commands via an IR protocol. Control device 1306 may also include other transmitters and/or receivers to transmit and/or receive information in accordance with other protocols (e.g., a RF-based communication protocol or an IP-based communication protocol). As shown in FIGS. 13A, 13C, 13E, and 13F, control device 1306 further includes a protruding member 1326. Protruding member 1326 may serve as a built-in stand to provide a better viewing angle for capacitive touch display screen 1328.

As shown in FIG. 13E, control device 1306 also includes metal charging contacts 1334 and 1336. Protruding member 1326 and metal charging contacts 1334 and 1336 are configured to physically and electrically couple control device 1306 to charging device 1350.

As shown in FIG. 13G, charging device 1350 includes a base 1358, a protruding member 1360, an illumination area 1356, and metal charging contacts 1352 and 1354. As shown in FIG. 13H, protruding member 1326 of control device 1306 is configured to be coupled to illumination area 1356 and metal charging contacts 1334 and 1336 of control device 1306 are configured to be magnetically and/or electrically coupled to metal charging contacts 1352 and 1354 of charging station 1350. Upon coupling control device 1306 with charging station 1350 (as shown in FIG. 13H), charging station 1350 charges a battery (not shown) included in control device 1306 and illumination area 1356 becomes illuminated, thereby indicating that the battery is being charged. When control device 1306 is coupled to charging station 1350, control device 1306 is substantially co-planar with charging station 1350.

Further Example Embodiments

A device, as defined herein, is a machine or manufacture as defined by 35 U.S.C. § 101. Devices may be digital, analog or a combination thereof. Devices may include integrated circuits (ICs), one or more processors (e.g., central processing units (CPUs), microprocessors, digital signal processors (DSPs), etc.) and/or may be implemented with any semiconductor technology, including one or more of a Bipolar Junction Transistor (BJT), a heterojunction bipolar transistor (HBT), a metal oxide field effect transistor (MOSFET) device, a metal semiconductor field effect transistor (MESFET) or other transconductor or transistor technology device. Such devices may use the same or alternative configurations other than the configuration illustrated in embodiments presented herein.

Techniques and embodiments, including methods, described herein may be implemented in hardware (digital and/or analog) or a combination of hardware and software and/or firmware. Techniques described herein may be implemented in one or more components. Embodiments may comprise computer program products comprising logic (e.g., in the form of program code or instructions as well as firmware) stored on any computer useable storage medium, which may be integrated in or separate from other components. Such program code, when executed in one or more processors, causes a device to operate as described herein. Devices in which embodiments may be implemented may include storage, such as storage drives, memory devices, and further types of computer-readable media. Examples of such computer-readable storage media include, but are not limited to, a hard disk, a removable magnetic disk, a removable optical disk, flash memory cards, digital video disks, random access memories (RAMs), read only memories (ROM), and the like. In greater detail, examples of such computer-readable storage media include, but are not limited to, a hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, as well as other media such as flash memory cards, digital video discs, RAM devices, ROM devices, and the like. Such computer-readable storage media may, for example, store computer program logic, e.g., program modules, comprising computer executable instructions that, when executed, provide and/or maintain one or more aspects of functionality described herein with reference to the figures, as well as any and all components, steps and functions therein and/or further embodiments described herein.

Computer readable storage media are distinguished from and non-overlapping with communication media. Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wired media as well as wireless media such as acoustic, RF, infrared and other wireless media. Example embodiments are also directed to such communication media.

The automatic port selection embodiments and/or any further systems, sub-systems, and/or components disclosed herein may be implemented in hardware (e.g., hardware logic/electrical circuitry), or any combination of hardware with software (computer program code configured to be executed in one or more processors or processing devices) and/or firmware.

Figure 14:
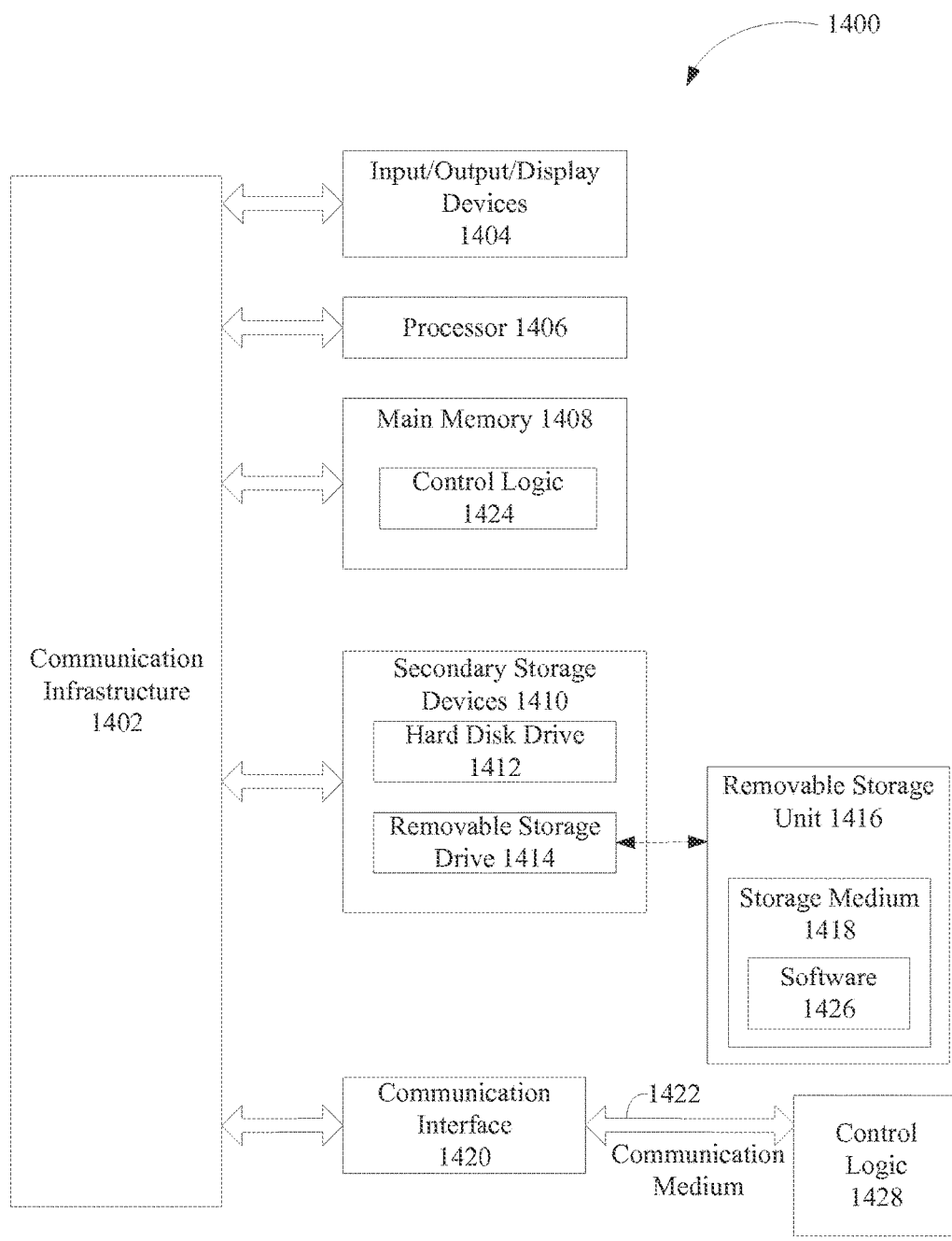
FIG. 14 is a block diagram of a computer system in accordance with an embodiment.

The embodiments described herein, including systems, methods/processes, and/or apparatuses, may be implemented using well known processing devices, telephones (smart phones and/or mobile phones), servers, electronic devices (e.g., consumer electronic devices) and/or, computers, such as a computer 1400 shown in FIG. 14. It should be noted that computer 1400 may represent communication devices, processing devices, servers, and/or traditional computers in one or more embodiments. For example, electronic devices 102A-102C, electronic devices 202A and 202B, electronic devices 402A-402E, electronic devices 702A-702E and/or electronic devices 1002A-1002E (as described above in reference to FIGS. 1, 2, 4, 7 and 10, respectively), control device 106, control device 406, control device 722, control device 724 and/or control device 1006 (as described above in reference to FIGS. 1, 4, 7 and 10, respectively), switching device 104, switching device 204, switching device 304, switching device 404, switching device 704 and/or switching device 1004 (as described above in reference to FIGS. 1-4, 7 and 10, respectively), any of the sub-systems, components or sub-components respectively contained therein, may be implemented using one or more computers 1400.

Computer 1400 can be any commercially available and well known communication device, processing device, and/or computer capable of performing the functions described herein, such as devices/computers available from International Business Machines®, Apple®, Sun®, HP®, Dell®, Cray®, Samsung®, Nokia®, etc. Computer 1400 may be any type of computer, including a desktop computer, a server, etc.

Computer 1400 includes one or more processors (also called central processing units, or CPUs), such as a processor 1406. Processor 1406 is connected to a communication infrastructure 1402, such as a communication bus. In some embodiments, processor 1406 can simultaneously operate multiple computing threads.

Computer 1400 also includes a primary or main memory 1408, such as random access memory (RAM). Main memory 1408 has stored therein control logic 1424 (computer software), and data.

Computer 1400 also includes one or more secondary storage devices 1410. Secondary storage devices 1410 include, for example, a hard disk drive 1412 and/or a removable storage device or drive 1414, as well as other types of storage devices, such as memory cards and memory sticks. For instance, computer 1400 may include an industry standard interface, such a universal serial bus (USB) interface for interfacing with devices such as a memory stick. Removable storage drive 1414 represents a floppy disk drive, a magnetic tape drive, a compact disk drive, an optical storage device, tape backup, etc.

Removable storage drive 1414 interacts with a removable storage unit 1416. Removable storage unit 1416 includes a computer useable or readable storage medium 1418 having stored therein computer software 1426 (control logic) and/or data. Removable storage unit 1416 represents a floppy disk, magnetic tape, compact disk, DVD, optical storage disk, or any other computer data storage device. Removable storage drive 1414 reads from and/or writes to removable storage unit 1416 in a well-known manner.

Computer 1400 also includes input/output/display devices 1404, such as touchscreens, LED and LCD displays, monitors, keyboards, pointing devices, etc.

Computer 1400 further includes a communication or network interface 1418. Communication interface 1420 enables computer 1400 to communicate with remote devices. For example, communication interface 1420 allows computer 1400 to communicate over communication networks or mediums 1422 (representing a form of a computer useable or readable medium), such as LANs, WANs, the Internet, etc. Network interface 1420 may interface with remote sites or networks via wired or wireless connections.

Control logic 1428 may be transmitted to and from computer 1400 via the communication medium 1422.

Any apparatus or manufacture comprising a computer useable or readable medium having control logic (software) stored therein is referred to herein as a computer program product or program storage device. This includes, but is not limited to, computer 1400, main memory 1408, secondary storage devices 1410, and removable storage unit 1416. Such computer program products, having control logic stored therein that, when executed by one or more data processing devices, cause such data processing devices to operate as described herein, represent embodiments of the invention.

Any apparatus or manufacture comprising a computer useable or readable medium having control logic (software) stored therein is referred to herein as a computer program product or program storage device. This includes, but is not limited to, a computer, computer main memory, secondary storage devices, and removable storage units. Such computer program products, having control logic stored therein that, when executed by one or more data processing devices, cause such data processing devices to operate as described herein, represent embodiments of the inventive techniques described herein.

CONCLUSION

While various embodiments have been described above, it should be understood that they have been presented by way of example only, and not limitation. It will be apparent to persons skilled in the relevant art(s) that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:
1. A switching device, comprising:
 a plurality of audio/video (AV) ports;
 a switch circuit that is operable to selectively connect any one of a plurality of source devices, each of which is connected to a corresponding one of the plurality of AV ports, to a sink device that is connected to another one of the plurality of AV ports; and a control signal detector that is operable to sniff wireless control signals that have been sent from different remote control devices to different source devices of the plurality of source devices;

the switching device being configured to:
  detect, by the control signal detector, that a wireless control signal has been sent from a remote control device to a source device of the plurality of source devices so that the remote control device can wirelessly control the source device;
  determine an identifier that identifies the source device to which the wireless control signal was sent;
  identify a first AV port from among the plurality of AV ports to which the identified source device is connected using a data structure that comprises a device-to-port mapping that identifies the first AV port to which the identified source device is connected based on the determined identifier; and
  automatically connect the first AV port to the AV port to which the sink device is connected so that content can be provided from the identified source device to the sink device.

2. The switching device of claim 1, wherein the switching device is configured to determine the identifier based on an indicator included in the wireless control signal that uniquely identifies the source device.

3. The switching device of claim 1, the switching device being further configured to:
  determine that a second remote control device is being utilized;
  identify a second source device that is associated with the second remote control device from among the plurality of source devices;
  identify a second AV port from among the plurality of AV ports to which the identified second source device is connected; and
  automatically connect the second AV port to the AV port to which the sink device is connected to that content can be provided by the identified second source device to the sink device.

4. The switching device of claim 1, wherein the wireless control signal is received via at least one of the following transmission schemes:
  an infrared-based transmission scheme;
  a radio frequency-based transmission scheme; and
  an internet protocol-based transmission scheme.

5. The switching device of claim 1, wherein the plurality of AV ports are High-Definition Multimedia Interface (HDMI) ports.

6. The switching device of claim 1, the switching circuit being further configured to:
  transmit a control signal to the identified source device that causes the identified source device to be powered on.

7. A system, comprising:
  one or more processors; and
  a memory containing computer-readable instructions, which, when executed by the one or more processors, is configured to perform operations in a switching device comprising a plurality of audio/video (AV) ports and a switch circuit that is operable to connect any one of a plurality of source devices, each of which is connected to a corresponding one of the plurality of AV ports, to a sink device that is connected to another one of the plurality of AV ports, the operations comprising:
    determining that a user has selected a piece of content via interaction with a control interface that is different than the plurality of AV ports;
    identifying a content providing service that provides the selected piece of content from among a plurality of content providing services that are accessible by the switching device, wherein the identified content providing service comprises one of a satellite TV service, a cable TV service, or a software application;
    determining an identifier that identifies a source device from the plurality of source devices that is configured to provide the piece of content from the identified content providing service;
    identifying a first AV port from among the plurality of AV ports to which the identified source device is connected based on the determined identifier using a data structure that comprises a device-to-port mapping that identifies the first AV port to which the identified source device is connected based on the determined identifier; and
    automatically connecting the first AV port to the AV port to which the sink device is connected so that content can be provided from the identified source device to the sink device.

8. The system of claim 7, wherein the identifying a source device from the plurality of source devices comprises:
  determining one or more source devices from among the plurality of source devices that are configured to provide the content; and
  selecting one of the one or more source devices to be the identified source device based on a priority scheme.

9. The system of claim 7, said operations further comprising:
  based on the selection, identifying the sink device from among a plurality of sink devices connected to corresponding ones of the plurality of AV ports; and
  identifying a second AV port from among the plurality of AV ports to which the sink device is connected, wherein the automatically connecting comprises automatically connecting the first AV port to the second AV port.

10. The system of claim 7, said operations further comprising:
  transmitting a control signal to the identified source device that causes the identified source device to be powered on.

11. The system of claim 7, wherein the plurality of AV ports are HDMI ports.

12. The system of claim 7, wherein the control interface is a graphical user interface (GUI) that is caused to be rendered on the sink device by the switching device.

13. The system of claim 12, further comprising:
  enabling a user to search across one or more databases containing a listing of content maintained by the plurality of content providing services for the piece of content via the GUI.

14. The system of claim 7, wherein the control interface is a GUI that is rendered and controllable via a display included in a remote control device.

* * * * *